United States Patent
Song et al.

(10) Patent No.: US 10,425,830 B2
(45) Date of Patent: Sep. 24, 2019

(54) MOBILE COMMUNICATION NETWORK SYSTEM AND METHOD FOR COMPOSING NETWORK COMPONENT CONFIGURATIONS

(71) Applicant: ELECTRONICS AND TELECOMMUNICATIONS RESEARCH INSTITUTE, Daejeon (KR)

(72) Inventors: Pyeong Jung Song, Daejeon (KR); Hyun Lee, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 200 days.

(21) Appl. No.: 15/258,954

(22) Filed: Sep. 7, 2016

(65) Prior Publication Data

US 2017/0070892 A1    Mar. 9, 2017

(30) Foreign Application Priority Data

Sep. 7, 2015 (KR) .................. 10-2015-0126463
Sep. 7, 2016 (KR) .................. 10-2016-0115050

(51) Int. Cl.
*H04W 16/18* (2009.01)
*H04W 48/20* (2009.01)
*H04L 12/24* (2006.01)
*H04W 84/00* (2009.01)

(52) U.S. Cl.
CPC ........... *H04W 16/18* (2013.01); *H04L 41/042* (2013.01); *H04L 41/0896* (2013.01); *H04L 41/5051* (2013.01); *H04W 48/20* (2013.01); *H04L 41/5096* (2013.01); *H04W 84/00* (2013.01)

(58) Field of Classification Search
CPC ..... H04W 16/14; H04W 80/04; H04W 16/02; H04W 16/10; H04W 72/04; H04W 72/1215; H04W 48/18; H04W 84/00; H04W 8/02; H04W 16/18
See application file for complete search history.

(56) References Cited

U.S. PATENT DOCUMENTS

| | | | |
|---|---|---|---|
| 2011/0099563 A1 | 4/2011 | Shin et al. | |
| 2011/0149968 A1 | 6/2011 | Kim | |
| 2015/0110008 A1 | 4/2015 | Puthenpura et al. | |
| 2015/0141009 A1 | 5/2015 | Tamura et al. | |
| 2015/0304892 A1 | 10/2015 | Perras et al. | |
| 2016/0353465 A1* | 12/2016 | Vrzic | H04W 12/06 |
| 2017/0054595 A1* | 2/2017 | Zhang | H04L 41/0803 |
| 2017/0164187 A1* | 6/2017 | Lu | H04W 8/24 |

FOREIGN PATENT DOCUMENTS

KR    10-1275293 B1    6/2013

* cited by examiner

*Primary Examiner* — Margaret G Mastrodonato
(74) *Attorney, Agent, or Firm* — Rabin & Berdo, P.C.

(57) ABSTRACT

Disclosed is a mobile communication network system and a network configuring method. The communication network system includes: a common control access network; at least one access network slice added according to a service type requested by a device; a common control core network; and at least one core network slice added according to a service type requested by the device. The access network slice and the core network slice are determined by the service type requested by the device.

20 Claims, 23 Drawing Sheets

FIG. 6
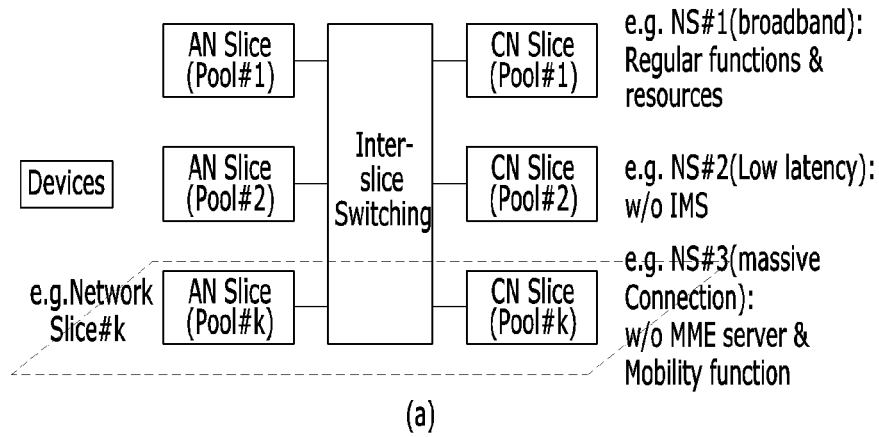
(a)
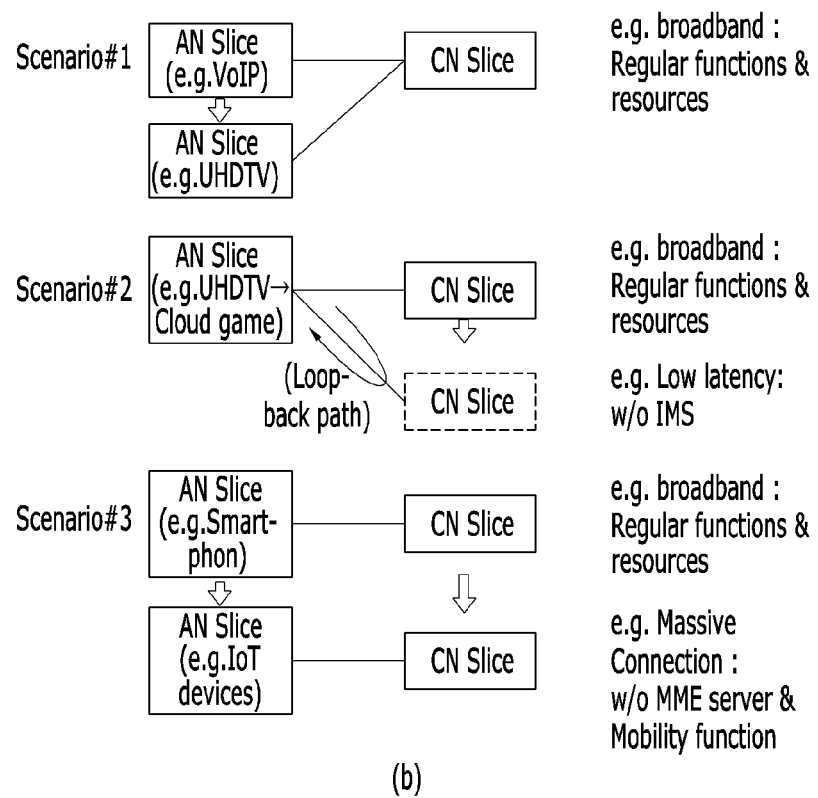
(b)

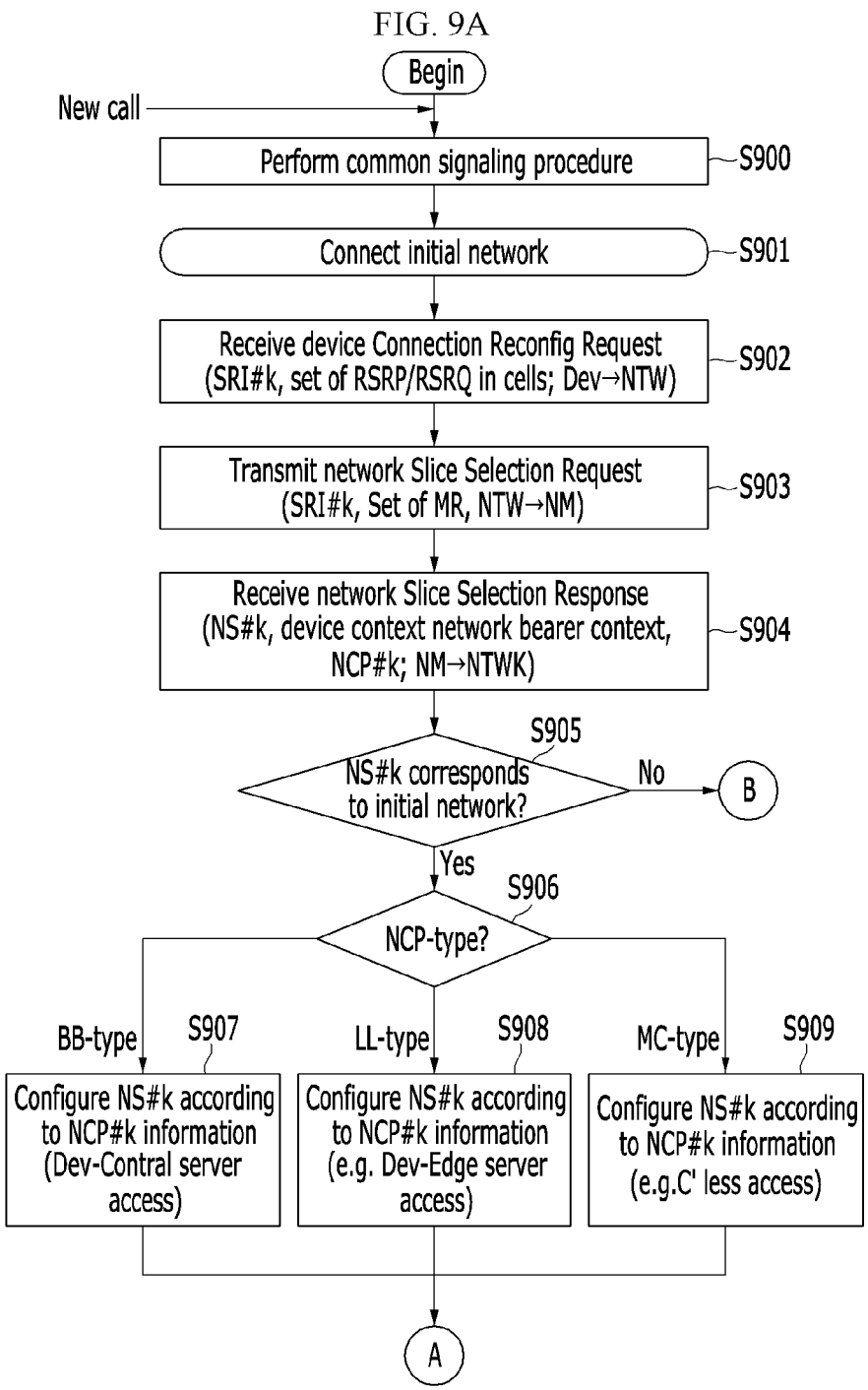

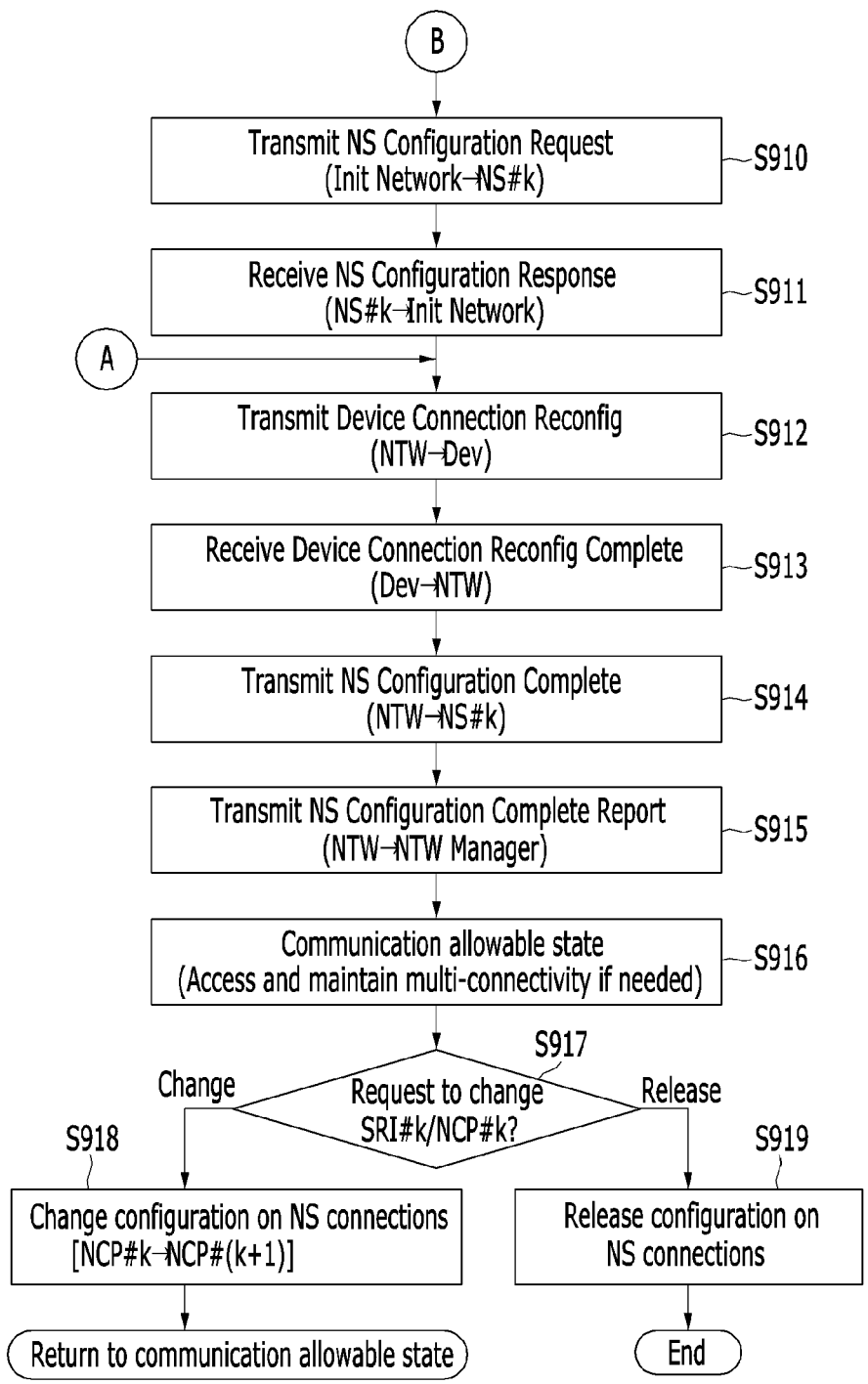

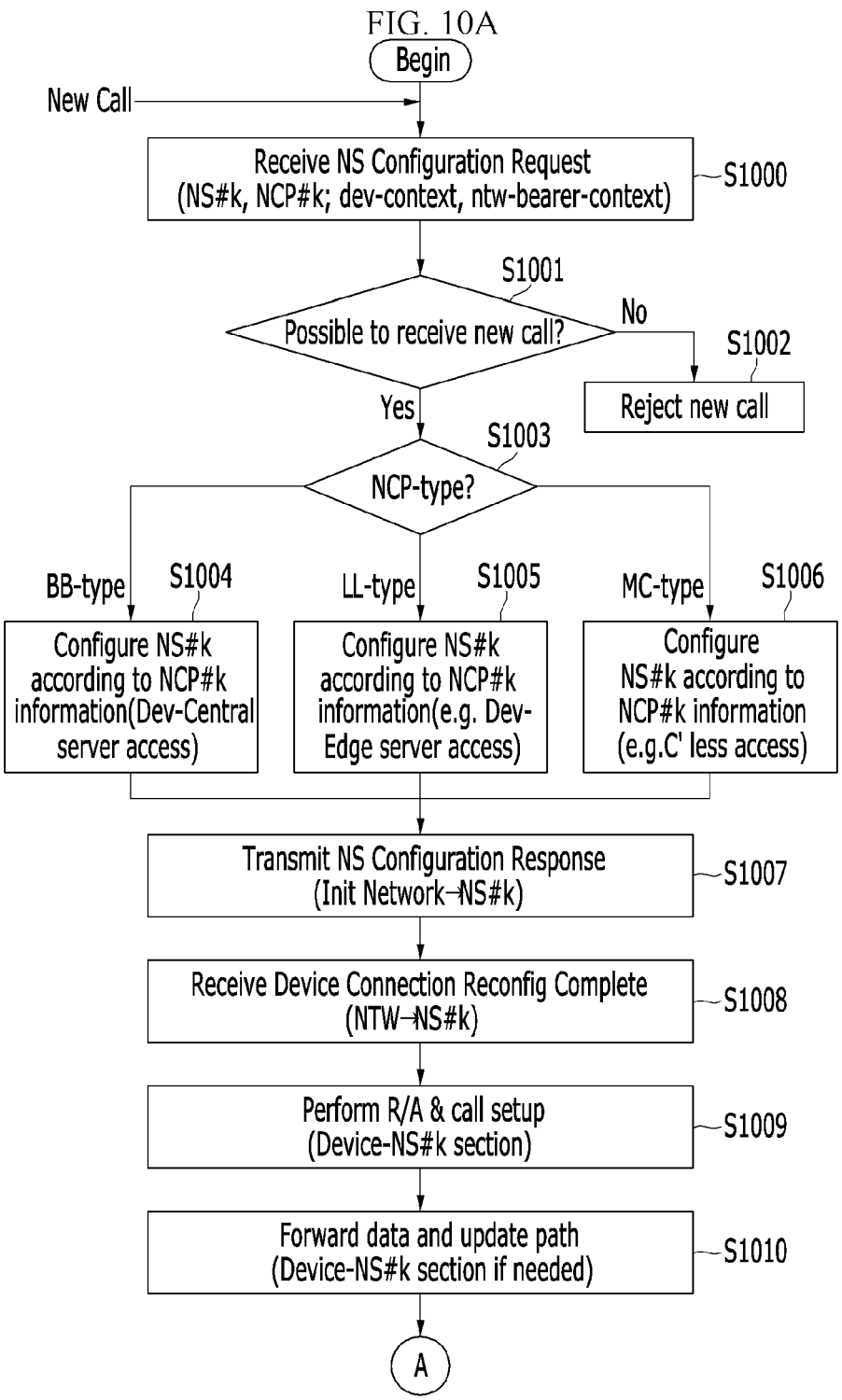

FIG. 12

| NCP \ NS | NCP_type | Service Priority(1-10) | E2E Packet Delay | Packet Error Rate | Packet Data Rate | ... |
|---|---|---|---|---|---|---|
| NS(#1) (Example→) | Broadband | Priority 3 | N1 ms | M1 BLER | Max value | |
| ... | | | | | | |
| NS(#k) (Example→) | Low_latency | Priority 2 | N3 ms | M3 BLER | Max value | |

Service Priority(1-10, 1 : highest, 10 lowest)

MOBILE COMMUNICATION NETWORK SYSTEM AND METHOD FOR COMPOSING NETWORK COMPONENT CONFIGURATIONS

CROSS-REFERENCE TO RELATED APPLICATION

This application claims priority to and the benefit of Korean Patent Application Nos. 10-2015-0126463 and 10-2016-0115050 filed in the Korean Intellectual Property Office on Sep. 7, 2015 and Sep. 7, 2016, respectively, the entire contents of which are incorporated herein by reference.

BACKGROUND OF THE INVENTION (a) Field of the Invention

The present invention relates to a mobile communication network system and a method for composing network component configurations.

(b) Description of the Related Art

In general, equipment configuring a mobile communication network does not have a flexible configuration, so it is difficult to add or modify a function, it is not easy to scale a resource up/down, and it is not easy to effectively receive various service requirements since software and hardware functions are closely combined with each other and interfaces for respective equipment elements are not opened.

Relating prior art documents include "Network Stack Virtualization" of U.S. Patent Laid-Open Publication No. 2015-0304892 and "Network device and method for supporting network virtualization" of Korea Patent No. 10-1275293.

SUMMARY OF THE INVENTION

The present invention has been made in an effort to provide a communication network system having an adaptive structure according to service requirements based on virtualization of a network resource, and method for configuring a network.

An exemplary embodiment of the present invention provides a communication network system including: a common control access network; at least one access network slice added according to a service type requested by a device; a common control core network; and at least one core network slice added according to a service type requested by the device, wherein the access network slice and the core network slice are determined by the service type requested by the device.

When the device requests a first service and a second service, a first access network slice caused by a type of the first service and a second access network slice caused by a type of the second service may be configured.

When the device requests a first service and a second service, a first core network slice caused by a type of the first service and a second core network slice caused by a type of the second service may be configured.

The common control access network may be an initial access network accessed as a default when a new connection is attempted according to a new call or a common control slice having a function performed in common from among access network slices.

The common control access network may perform a common control function including authentication and mobility control, and may provide a service not supported by the access network slice.

The common control core network may be an initial core network accessed as a default when a new connection is attempted according to a new call, or a common control slice having a function performed in common by core network slices.

One of the common control access network and the common control core network may determine an access network slice and a core network slice corresponding to a service type requested by the device from among a plurality of access network slices and a plurality of core network slices.

One of the common control access network and the common control core network may drop one of the plurality of access network slices or may drop one of the plurality of core network slices.

One of the common control access network and the common control core network may add a new access network slice and a new core network slice corresponding to the service type requested by the device.

A number of the access network slices and a number of the core network slices determined according to the service type requested by the device may correspond to each other.

A number of the access network slices and a number of the core network slices determined according to the service type requested by the device may be different from each other.

Another embodiment of the present invention provides a method for configuring a network in a communication network system, including: allowing a network configuring device that is one of a common control access network and a common control core network of the communication network system to determine a network slice corresponding to a service type requested by a device; and allowing the network configuring device to instruct the determined network slice to configure a resource and a function corresponding to the service type, wherein the network slice includes an access network slice corresponding to the service type, and further includes a core network slice according to the service type.

The method may further include: allowing the network configuring device to determine to add a new network slice corresponding to a new service type requested by a device; and allowing the network configuring device to instruct the network slice determined to be added to configure a function corresponding to the service type.

The instructing to configure a function corresponding to the service type may further include: allowing the network slice determined to be added to receive an activation request from the network configuring device; allowing the network slice determined to be added to discover a corresponding network function and interconnect the discovered network function; and after the network slice determined to be added performs the process, transmitting a response to the activation request to the network configuring device.

The method may further include: allowing the network configuring device to determine to drop the network slice corresponding to the existing service type when the service type requested by the device is changed; and allowing the network configuring device to instruct the network slice determined to be dropped to release the corresponding resource and the function.

The determining of a network slice may include determining the network slice by additionally considering a subscriber profile including subscriber registration and authentication information.

The network configuring device may correspond to an initial network accessed as a default when a new connection is attempted according to a new call, or a common control slice having a function performed in common from among network slices.

An access network slice and a core network slice may be configured for respective service types, and a number of the access network slices and a number of the core network slices included in the network slice determined according to the service type requested by the device may correspond to each other.

Another embodiment of the present invention provides a method for configuring a network in a communication network system, including: allowing a network manager for controlling an access network and a core network to receive a service requirement including a service type of a device; allowing the network manager to determine a network slice satisfying the service requirement; allowing the network manager to form network configuration information on a resource and a function of the determined network slice; and allowing the network manager to transmit the network configuration information to the determined network slice so that the determined network slice may configure the resource and the function, wherein the network slice may include an access network slice corresponding to the service type and may further include a core network slice according to the service type.

The determining of a network slice may include binding an access network slice corresponding to the service type and the core network slice to configure a network slice. In this instance, the configuring of a network slice may include at least one of: changing the configuration of the access network slice and maintaining the configuration of the core network slice; maintaining the configuration of the access network slice and changing the configuration of the core network slice; and changing the configuration of the access network slice and the configuration of the core network slice.

BRIEF DESCRIPTION OF THE DRAWINGS

FIG. 6 shows a conceptual diagram for selecting a network slice satisfying a service requirement and configuring the same according to an exemplary embodiment of the present invention.

FIG. 9A and FIG. 9B show a flowchart for showing an operation of a network in a method for selecting a network slice according to a service requirement and configuring the same according to an exemplary embodiment of the present invention.

FIG. 10A and FIG. 10B show a flowchart for showing an operation of a network slice in a method for selecting a network slice according to a service requirement and configuring the same according to an exemplary embodiment of the present invention.

FIG. 12 shows an exemplary diagram for showing configuration information of a network slice according to an exemplary embodiment of the present invention.

DETAILED DESCRIPTION OF THE EMBODIMENTS

Figure 1:
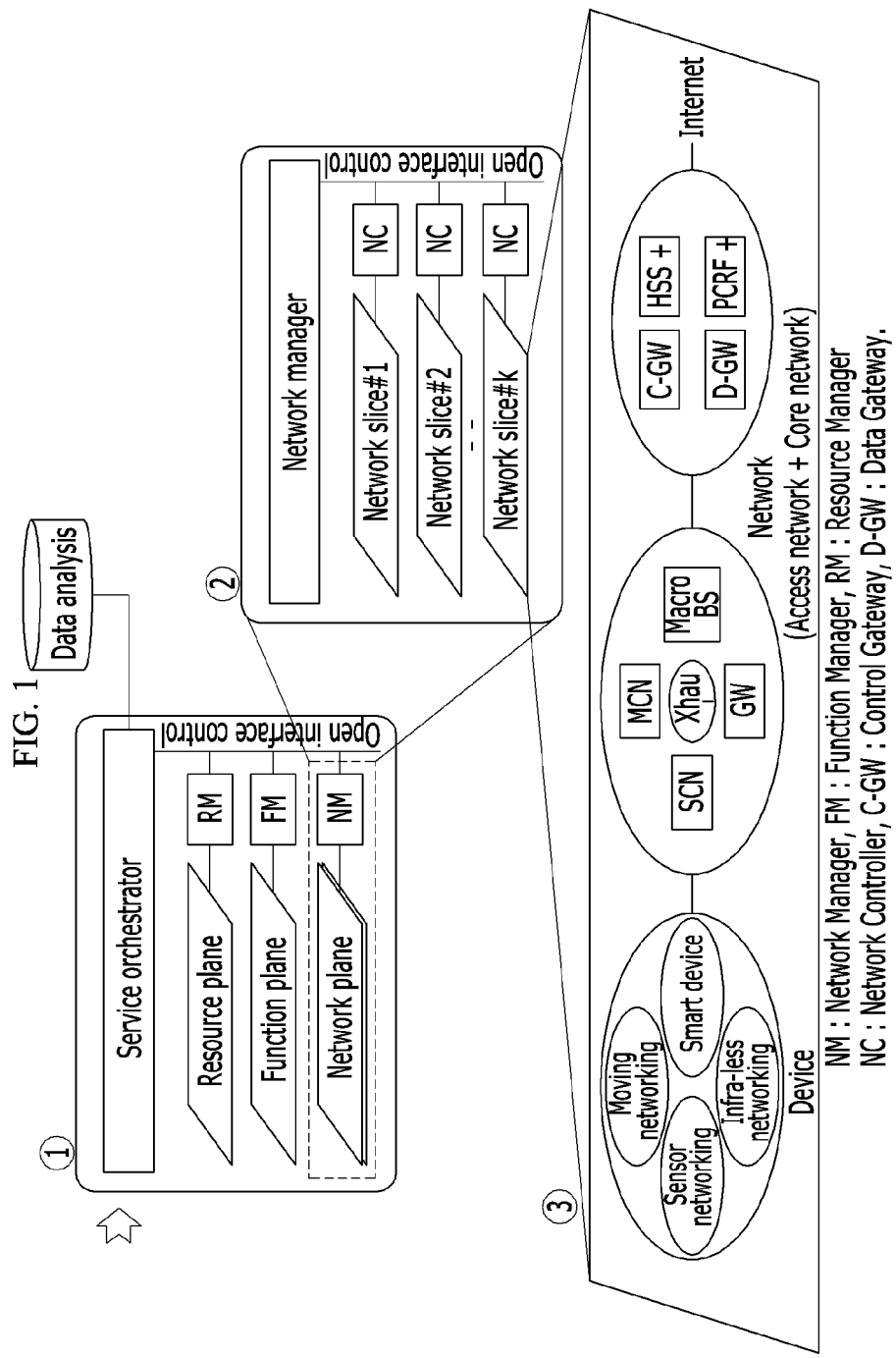
FIG. 1 shows an entire structure of a network slice structure-based mobile communication network using virtualization according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

In an exemplary embodiment of the present invention, a network slice (NS) represents a set of a logical network function and a resource formed by use of a virtualization concept of a network resource so as to support communication service requirements for respective users. The network slice may also be referred to as a network slice instance (NSI). An initial network (Init network or Network) may also be referred to as a default network (or default-RAN), a common control network function-access network (CCNF-AN) part, or a common control network function-core network (CCNF-CN) part. The access network may mean a cell. The device represents various types of terminal equipment (e.g., UE, vehicles, sensors, or robots), or subscribers.

Further, a network control protocol (NCP)_type may have a same meaning as a service type (Service_type) and may mean a service requirement.

A communication network system according to an exemplary embodiment of the present invention and a network configuring method will now be described with reference to accompanying drawings.

FIG. 1 shows an entire structure of a network slice structure-based mobile communication network using virtualization according to an exemplary embodiment of the present invention.

As shown in FIG. 1, the network slice structure-based mobile communication network using virtualization includes three major fields of a first field, a second field, and a third field.

The first field (①) represents a part for controlling and managing a mobile communication network function and a resource. The first field may be a conceptual configuration and it includes a service orchestrator.

The service orchestrator allocates wired or wireless resources (e.g., computing, storage, or networks) to the network slice (NS) through a resource manager (RM) and manages the same, it allocates wired or wireless function elements (e.g., an execution code of a function element) to corresponding equipment of each network slice (NS) through a function manager (FM) and manages the same, and it controls to configure an end-to-end (E2E) path satisfying a communication service requirement (or a new call) through a network manager (NM). The FM, the RM, and the NM may repeatedly have the functions of the three managers.

The service orchestrator controls and manages various kinds of resources and functions in a software manner according to a creation of new services or policies of service providers, thereby easily scaling the network wire/wireless resources up/down and variably and quickly operating and maintaining the network.

The second field (②) represents a part for determining the network slice (NS) and forming configuration information on resources and functions thereof, and it includes a network manager (NM).

The network manager (NM) determines an optimized network slice according to a service requirement of the device, and forms configuration information of the resource and the function of the determined network slice. The network slice may be additionally generated, modified, or dropped by a new service (or a new call).

The network manager (NM) may be realized into a large-capacity and high-speed server together with a hard-wired node (e.g., a packet data network (PDN)-gateway or a software defined network (SDN) controller) inside the core network in the mobile communication network or when provided in a network operation & maintenance (O&M) center managed by the service provider.

The network slice (NS) may be managed for the usage of a broadband, low latency, massive connectivity, and Internet (e.g., a best effort network) depending on key capabilities of the network.

The network controller (NC) may report state information (e.g., overloads or error rates) on the network slice under a corresponding coverage to the network manager (NM) periodically or in an event-driven manner, and this function may be implemented in a software manner through an open interface control.

The network manager (NM) may control a wire/wireless resource allocation amount between respective network slices by using information provided by the network controller (NC), that is, feedback information. The network controller (NC) may be provided inside the core network (e.g., PDN-gateway) and may be performed in the mobile communication network.

The resource and the function of the network slice may be managed for the usage of the broadband, low latency, massive connectivity, and Internet (e.g., best effort network) depending on the key capabilities of the network.

Examples of the resource and the function of the respective network slices for satisfying the key capabilities of the network are as follows.

When the key capability of the network is the large capacity, the resource and the function of the network slice may exemplarily include a function for selecting one from among a multi-X (radio access technology (RAT), band, cell), an overlap between a millimeter wave and a carrier, and a hierarchical cell structure (HCS) including close small cells.

When the key capability of the network is the low latency, the resource and the function of the network slice may include a flat network structure (edge server) for reducing a traffic delay and a signaling delay, a front & back haul (Xhaul)-networking function, and a router resource with high-speed data processing performance.

When the key capability of the network is the massive connectivity, the resource and the function of the network slice may include: a device networking structure in consideration of flexible signaling that is efficient for transmission of short packets such as machine type communication (MTC), vehicle-to-everything (V2X), or Internet of things (IoT), and a transmission system; and a structure that does not use an IP multimedia subsystem (IMS) server and a mobility function.

When the network slice (NS) is determined and the corresponding resource and the function are formed, a method given below may be applied.

1) A slice type is selected for each service type, and the resource and the network function are provided on the network slice corresponding to the selected slice type.

2) After the resource and the network function of the slice is provided for each service type, one network slice satisfying the service type is selected.

3) After a slice resource is allocated for each service type, a network function is provided on the corresponding resource.

The third field (③) corresponds to the network slice formed by the network manager (NM). The network slice (NS) is formed with a total of the access network (or radio access network (RAN)), the core network (CN), and the device, or part thereof in the mobile communication system. The network slice may be classified in detail as follows.

The access network may include devices including a
   macro cell node, a small cell node, a remote radio
   head/radio unit (RRH/RU), a relay node, and a gateway. Further, the access network may be realized as a macro cell-based highly-integrated small cell disposed structure in a heavy-traffic area. The access network includes an access network such as a wired network, a radio network, or a WiFi.

The core network may be formed with servers or devices including a control gateway (C-GW, for example, control parts of a mobility management entity (MME) of the long term evolution (LTE), a serving gateway (SGW), a PDN gateway (PGW), a data gateway (D-GW, for example, data parts of the SGW/PGW of the LTE), a home subscriber server (HSS+), a policy and charging rule function plus (PCRF+), and a router.

The device (or a device network) may include a smart device, a sensor networking unit, a moving networking (e.g., V2X) unit, and infra-less device networking (e.g., an improved device-to-device (D2D)/MTC) unit. The device (or a device network) may be extended to a subject-centered device to generate a networking form (e.g., a sensor/IoT network).

Meanwhile, the network manager (NM) is operable by an access network manager (AN-Manager), a core network manager (CN-Manager), and a device network manager (DN-Manager) for managing and controlling the resources/functions of the access network, the core network, and the device (or the device network). In this case, the network manager (NM) totally manages and controls the three managers. Open-type interfaces are provided among the AN manager, the CN manager, and the DN manager, so it may be easy to supply multi-vendor equipment to the three separated sub-networks.

According to an exemplary embodiment of the present invention, the network generally targets a combination of the access network (e.g., a specific device on the AN or a combination thereof) and the core network (e.g., a specific device on the CN or a combination thereof), but is not limited thereto.

A process for selecting a network slice according to a service requirement and configuring the same will now be described.

Figure 2:
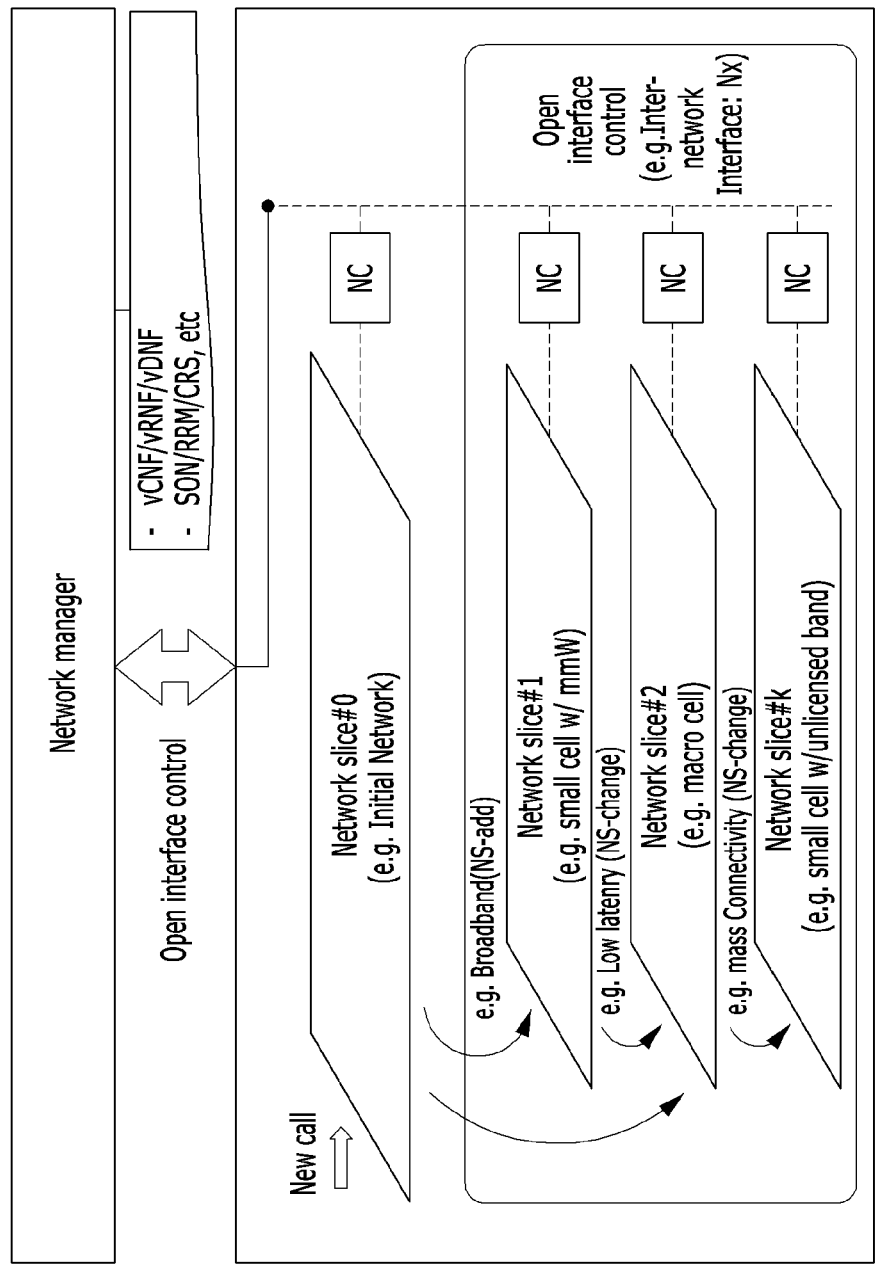
FIG. 2 shows a process for a network manager to select a network slice satisfying a service requirement and configure the same according to an exemplary embodiment of the present invention.

FIG. 2 shows a process for selecting a network slice satisfying a service requirement and configuring the same according to an exemplary embodiment of the present invention.

As shown in FIG. 2, a plurality of network slices are provided. The network slice may be provided according to the service type.

A device is accessed to an initial network, a network slice satisfying a service requirement (e.g., a service type) of the device is selected, and configuration information on the resource and the function of the selected network slice is formed.

The initial network represents a network (e.g., including a 5G macro network slice, a 4G macro network, a new-radio-type macro cell, or an evolved-UMTS terrestrial radio access network (E-UTRAN) type macro cell) that is accessed as a default when attempting a new connection according to a new call (i.e., an initial stage of a call). One network slice (e.g., Network Slice#0) of a plurality of network slices (Network Slice#0 to Network Slice#k) may be selected as the initial network. The initial network (e.g., Network Slice#0) may be selected by the network manager (NM).

The network slice (e.g., NS#K) satisfying the service requirement of the device (e.g., D#k) is selected, and in detail, the network slice is determined in consideration of the service requirement of the device, received signal intensity of cells that are adjacent to the device, and device subscriber registration information (e.g., quality of service (QoS) or billing information) of the network, and configuration information on the resource and the function of the determined network slice is formed. When the service requirement of the device is changed, the network slice (NS#K) may be reset. For example, when the service requirement is changed during communication, the network slice is changed.

The device is operable in a multimode (e.g., a combination of a robot and a smart phone) in addition to a single mode (e.g., a V2X), and a new service requirement (e.g., a plurality of calls) may be added, changed, or released during the communication. For example, when the service for watching an ultra-high definition (UHD) TV is changed to a connection to a low-latency large-capacity service of a Cloud game through the device, a carrier frequency and a processing performance of a router for forming a front-haul/back-haul networking as well as a waveform scheme (e.g., universal filtered multi-carrier (UFMC), generalized frequency division multiplex (GFDM), a filter bank multi-carrier (FBMC)), a radio frame structure (e.g., short/long transmission time interval (TTI)), and a random access scheme (e.g., a contention/non-contention based random access) are selectively re-configured.

The device is additionally accessed with a new network slice while maintaining the network slice that currently undergoes communication, thereby simultaneously accessing a plurality of networks.

The process for selecting a network slice satisfying the service requirement and configuring the resource and the function may be performed in linkage with the network manager (NM), and the process for selecting a network slice and configuring the resource and the function by the network manager (NM) may be performed by the service provider at an earlier stage of installing network equipment.

Figure 3:
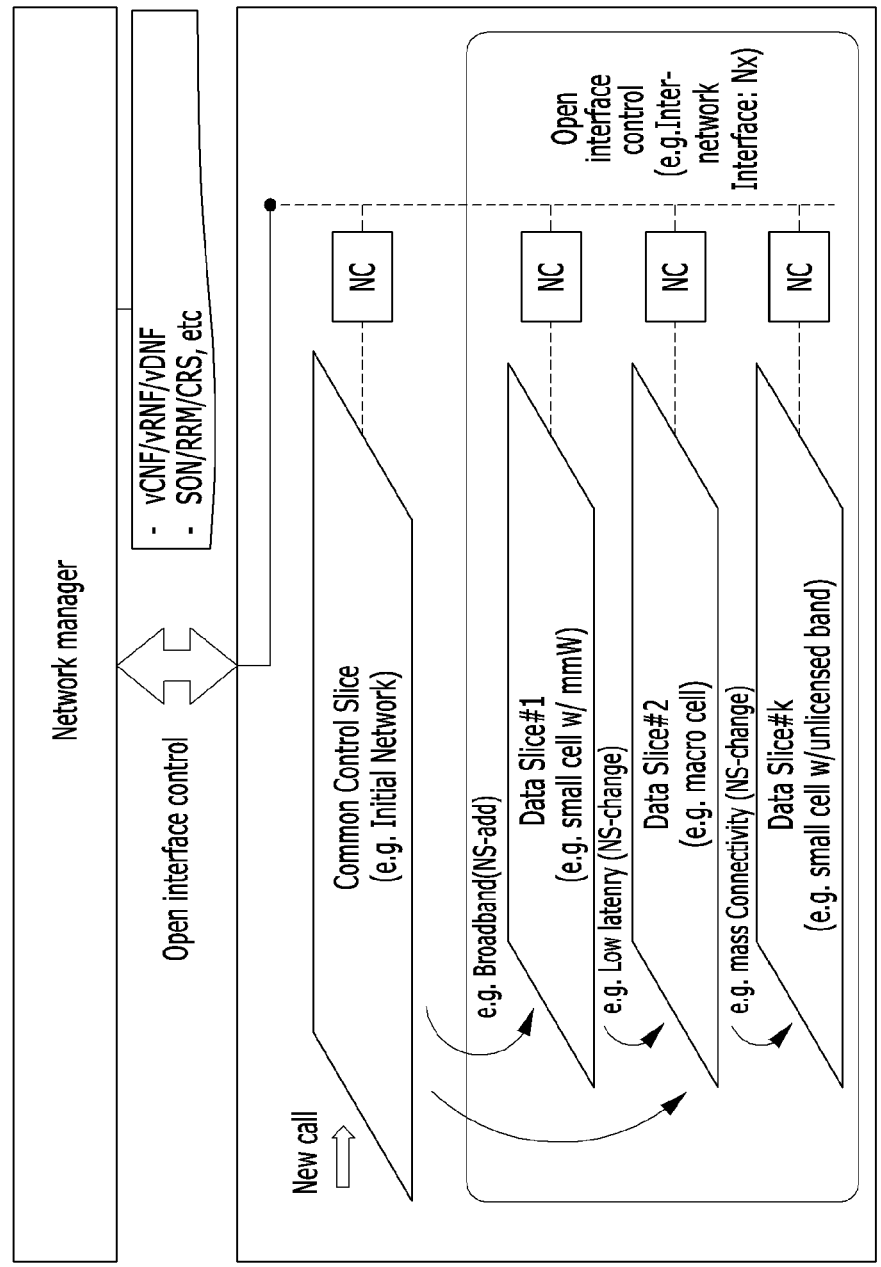
FIG. 3 shows another process for a network manager to select a network slice satisfying a service requirement and configure the same according to an exemplary embodiment of the present invention.

FIG. 3 shows another process for selecting a network slice satisfying a service requirement and configuring the same according to an exemplary embodiment of the present invention.

As shown in FIG. 3, instead of selecting an initial network (e.g., Network Slice#0), a common control slice (CCS) is used. In this case, the device is connected to the common control slice (CCS) at an earlier stage of setting a call (e.g., initial attach).

The common control slice (CCS) may be formed to be a single independent network slice. The common control slice (CCS) performs a similar function to the above-described initial network 'Network Slice#0'. The common control slice (CCS) may be a network slice having functions (e.g., authentication) performed in common by the network slices. Further, the common control slice (CCS) may be a default network slice for providing a service (VoIP or public Internet) not supported by the network slice.

The common control slice (CCS) may select a network slice optimized for the service requirement of the device and may form a configuration of the resource and the function of the selected network slice. The above-noted operation may be performed in linkage with the network manager (NM).

In addition, short packet information (e.g., non-connection-type short information) may be loaded on a specific signaling message (e.g., an L3 radio resource control (RRC) message) of the common control slice (CCS) and may then be transmitted to cause a signaling load and a low-latency transmission effect.

The initial network may be substituted with an existing mobile network (e.g., an E-UTRAN macro cell).

A network structure classifying the network of FIG. 2 and FIG. 3 into the access network (RAN) and the core network (CN) will now be described.

Figure 4:
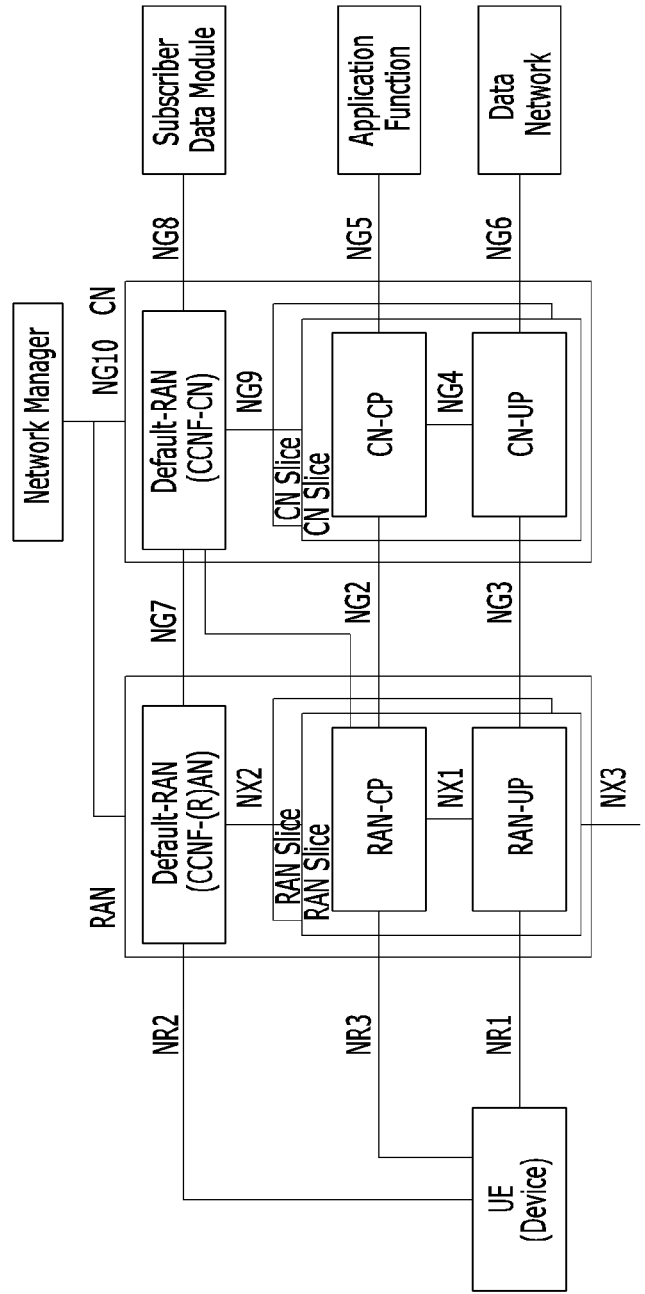
FIG. 4 shows a network configuration in which a network is classified into an access network and a core network according to an exemplary embodiment of the present invention.

FIG. 4 shows a network configuration in which a network is classified into an access network and a core network according to an exemplary embodiment of the present invention.

As shown in FIG. 4, the network includes an access network (RAN) and a core network (CN).

The access network (RAN) includes at least one access network slice (a RAN slice hereinafter) and a default access network (a default RAN) for controlling the RAN slice in common. The core network (CN) includes at least one core network slice (a CN slice hereinafter) and a default core network (default CN) for controlling the CN slice in common. The default access network (default RAN) may be an initial access network designated as a default as shown in FIG. 2, and it may also be a common control slice as shown in FIG. 3. The default core network (default CN) may be an initial core network designated as a default as shown in FIG. 2, and it may also be a common control slice as shown in FIG. 3. The default access network may be referred to as a common control access network, and the default core network (default CN) may be referred to as a common control core network. The default access network and the default core network may perform a common control function including authentication and mobility (handover), and they may provide a service (e.g., VoIP or public Internet) not supported by the access/core network slices.

The RAN slice and the CN slice may be specialized for respective service types, and when there are a plurality of service types, a plurality of RAN slices and a plurality of CN slices are provided. When a service type requested by a device (e.g., UE) is added, the RAN slice/CN slice may be added, and when the service type is canceled, the RAN slice/CN slice may be dropped.

The default access network (default RAN) performs functions including system information broadcasting and a random access, and the default core network (default CN) performs functions including network slice instance (NSI) selection, mobility management, and authority & authentication.

The RAN slice is classified into a control plane (RAN-CP) and a user plane (RAN-UP), and the CN slice is classified into a control plane (CN-CP) and a user plane (CN-UP). The control plane (RAN-CP) selects network functions configuring the user plane (RAN-UP) and combines the same to generate a user path so that traffic may be transmitted on the access network slice (RAN slice) satisfying the device (e.g., UE) and the service type (e.g., an enhanced mobile broadband (eMBB)). The control plane (CN-CP) selects network functions configuring the user plane (CN-UP) and combines the same to generate a user path so as to satisfy the service type (e.g., eMBB).

The device is connected to the access network (RAN) through radio interfaces NR1 to NR3. The device is connected to the default access network (default RAN) through the radio interface (NR2), and the radio interface (NR2) may perform a common control function of the RAN slices and may include a system information broadcasting function and a random access function. The device is connected to the RAN-CP slice through the radio interface NR3, and the radio interface NR3 performs a signaling function (e.g., a RRC connection) for exclusive use. The device is connected to the RAN-CP slice through the radio interface NR1, and the radio interface NR1 performs a traffic transmission function between the device and the RAN-CP slice.

The radio interfaces NX1 to NX3 are inside-RAN interfaces or inter-RAN interfaces. Radio interfaces NG2 to NG10 include an inter-RAN-CN interface, inside-CN interface, and an interface between the CN and an external device.

Regarding such the network structure, the RAN slice and the CN slice may form a single network slice (e.g., an E2E network slice). The RAN slice and the CN slice may be selected according to the service type requested by the device and may then be bonded to form a single network slice. Further, one RAN slice may be selected according to the service type (e.g., public Internet or VoIP) to form the network slice.

A number of RAN slices and a number of CN slices configuring the network slice may or may not be the same depending on the service type. For example, one RAN slice and one CN slice may form one network slice. In another way, two RAN slices and one CN slice may form one network slice.

In the case of the NSI selection function, the RAN slice and the CN slice may be selected by using information of the device (e.g., UE) and subscriber profile information of the subscriber data management (SDM). Such selection of the RAN slice and the CN slice may be performed by the default access network (default RAN) or the default core network (default CN). The NSI selection such as the selection of the RAN slice/the CN slice according to the default access network (default RAN) or the default core network (default CN) may be performed during communication service with the device after the initial installation of network equipment. The device is additionally accessed to a new network slice while maintaining the current communicating network slice so it may simultaneously access a plurality of networks.

Figure 5:
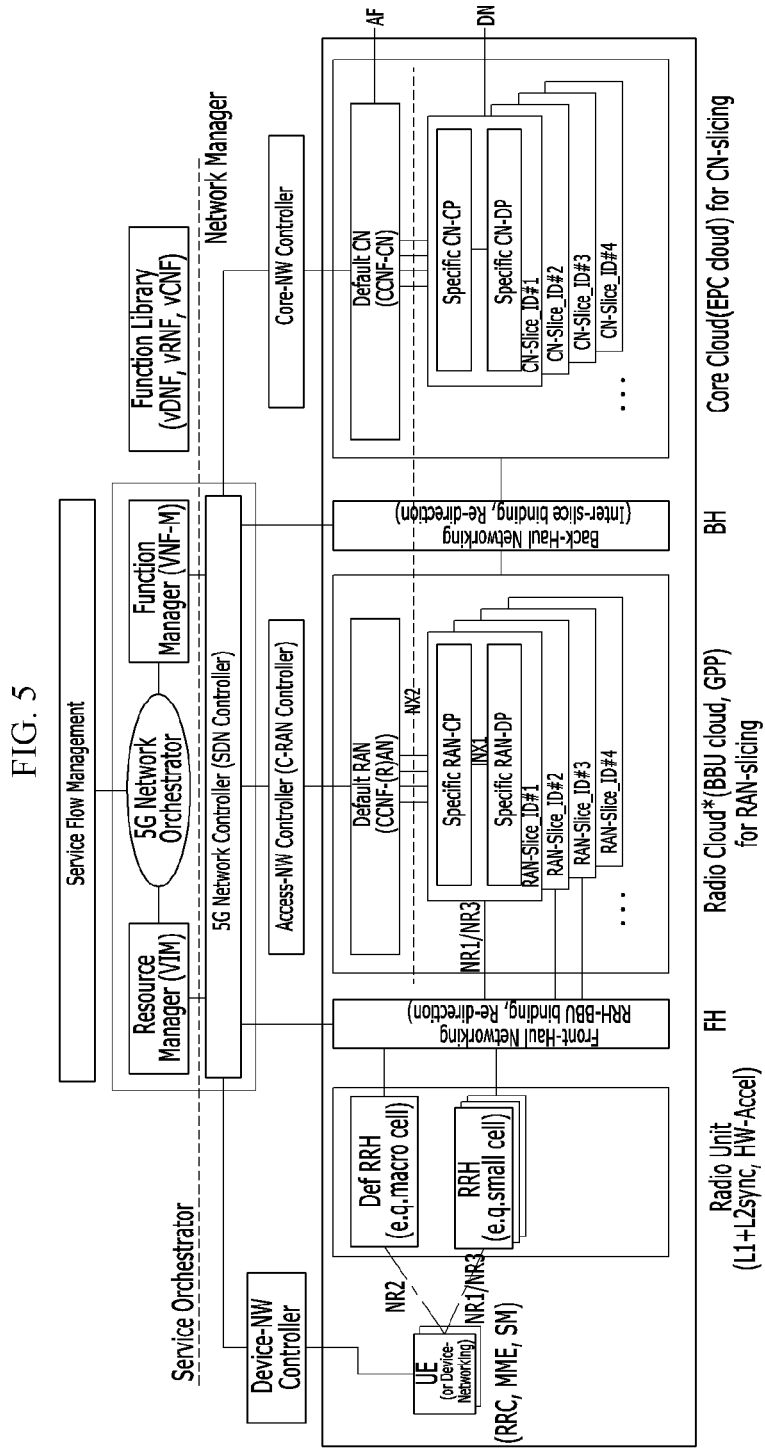
FIG. 5 shows a structure of a communication network system according to an exemplary embodiment of the present invention.

FIG. 5 shows a structure of a communication network system according to an exemplary embodiment of the present invention.

FIG. 5 shows a structure of a communication network system based on a structure of a network of FIG. 4.

As shown in FIG. 5, the communication network system includes an access network (RAN) and a core network (CN), and in detail, the access network (RAN) includes at least one RAN slice and a default access network (default RAN), and the core network (CN) includes at least one CN slice and a default core network (default CN). A detailed structure corresponds to that of FIG. 4 so no detailed description thereof will be provided.

As shown in FIG. 5, the function of the access network (RAN) may be divided into a radio unit (or a remote radio head (RRH)) and a radio Cloud unit (corresponding to the RAN slice). Fronthaul (FH) networking is performed between the radio unit and the radio Cloud unit, and backhaul (BH) networking is performed between the radio Cloud unit and a core Cloud unit.

The radio unit (RRH) includes radio functions realized as hardware that is sensitive to the real-time system (e.g., hardware accelerator, RF, or modem), and the radio Cloud unit may include functions that may be realized as software (e.g., a generation partnership project (GPP) environment; a radio layer-2 function such as a radio link control (RLC)/packet data convergence protocol (PDCP), and a radio layer-3 function such as radio resource control (RRC)/session management (SM)/mobility management (MM).

The radio unit (RRH) includes a default RRH (def RRH). The default RRH (def RRH) is an RRH linking to the default access network (default RAN), and it may link to the default core network (default CN) to form an E2E default connection at initial call setting.

The device network corresponds to networking (e.g., V2X or sensor networking) formed with a plurality of devices, and it may be controlled by a network controller of the network manager (NM).

The network manager (NM) performs a total control function on the E2E path formed with a device (or a device network), a radio unit (RRH), a fronthaul (FH) networking, a radio Cloud unit, backhaul (BH) networking, and a core Cloud unit, and a management function for the resource of the RAN/CN and the network function. The service orchestrator may perform a function shown in FIG. 1.

FIG. 6 shows a conceptual diagram for selecting a network slice satisfying a service requirement and configuring the same according to an exemplary embodiment of the present invention.

Regarding FIG. 6 (a), the RAN slice (shown as the access network (AN) slice in FIG. 6) and the CN slice satisfying the service requirement are selected, and the selected AN slice and CN slice are bound to form a network slice. For this purpose, the device has complex modes (e.g., a large capacity mode, a low latency mode, a massive connectivity mode. etc.) for supporting various service requirements, and the service requirement is requested to be modified during communication.

In an exemplary embodiment of the present invention, as shown in FIG. 6 (b), an AN slice and a CN slice satisfying the service requirement may be selected based on a plurality of scenarios and may be combined to form a network slice as follows.

Scenario 1

Scenario 1 according to an exemplary embodiment of the present invention corresponds to a case in which the configuration of the AN slice is changed and the configuration of the CN slice is not changed.

For example, when the service requirement is changed from a general VoIP to a large capacity UHD TV, the AN slice is changed. For example, the AN slice may be changed into a small cell for supporting large capacity in the general macro cell.

The changed AN slice is connected to the CN slice by using an explicit message on the open interface (e.g., S1) according to configuration information of the network resource/function set by the network manager (NM). Here, the explicit message is a message (e.g., an initial UE message) transmitted to the CN slice by the AN slice during call setting.

Scenario 2

Scenario 2 according to an exemplary embodiment of the present invention corresponds to the case in which the configuration of the AN slice is not changed and the configuration of the CN slice is changed.

For example, when the service requirement is changed into a low-latency Cloud game from the large-capacity UHD TV, the CN slice is changed. In this case, the CN slice (e.g., an IP Multimedia core network Subsystem/Evolved Packet Core (IMS/EPC) function) is a configuration performed in a substituted manner on an edge server provided near the access network so as to satisfy the low-latency E2E path requirement (e.g., 5 ms delay), and actually, the E2E path may not be connected to the core network but may be looped back from the access network.

The AN slice selects a gateway (or a port) for accessing the optimized CN slice on the open interface (e.g., an inter-network interface, S1) according to configuration information of the network resource/function set by the network manager (NM), and it is then connected to the CN slice by use of an explicit message. Here, the explicit message represents a message (e.g., an initial UE message) transmitted to the CN slice for the first time by the AN slice during call setting.

Scenario 3

Scenario 3 according to an exemplary embodiment of the present invention corresponds to the case in which the configuration of the AN slice and the configuration of the CN slice are changed.

For example, regarding a smart phone, when the service requirement is changed to a specialized service on the IoT basis with less mobility, the AN slice is changed to a special cell for exclusive use of the IoT, and the CN slice is changed into the configuration requiring no MME server resource and mobility function.

The AN slice selects a gateway (or a port) for accessing the optimized CN slice on the interface (e.g., S1) according to configuration information of the network resource/function set by the network manager (NM), and it is then connected to the CN slice by use of an explicit message. The explicit message represents a message (e.g., an initial UE message) transmitted to the CN slice for the first time by the AN slice during call setting.

When the network slice is selected and formed, the AN slice that is the RAN slice and the CN slice may be determined under the supervision of the default core network (default CN), the default access network (default RAN) and the default core network (default CN) select a RAN slice and a CN slice satisfying the service type respectively according to the determination, and the network slice may be formed by the combination of the selected RAN slice and the CN slice.

Figure 7A:
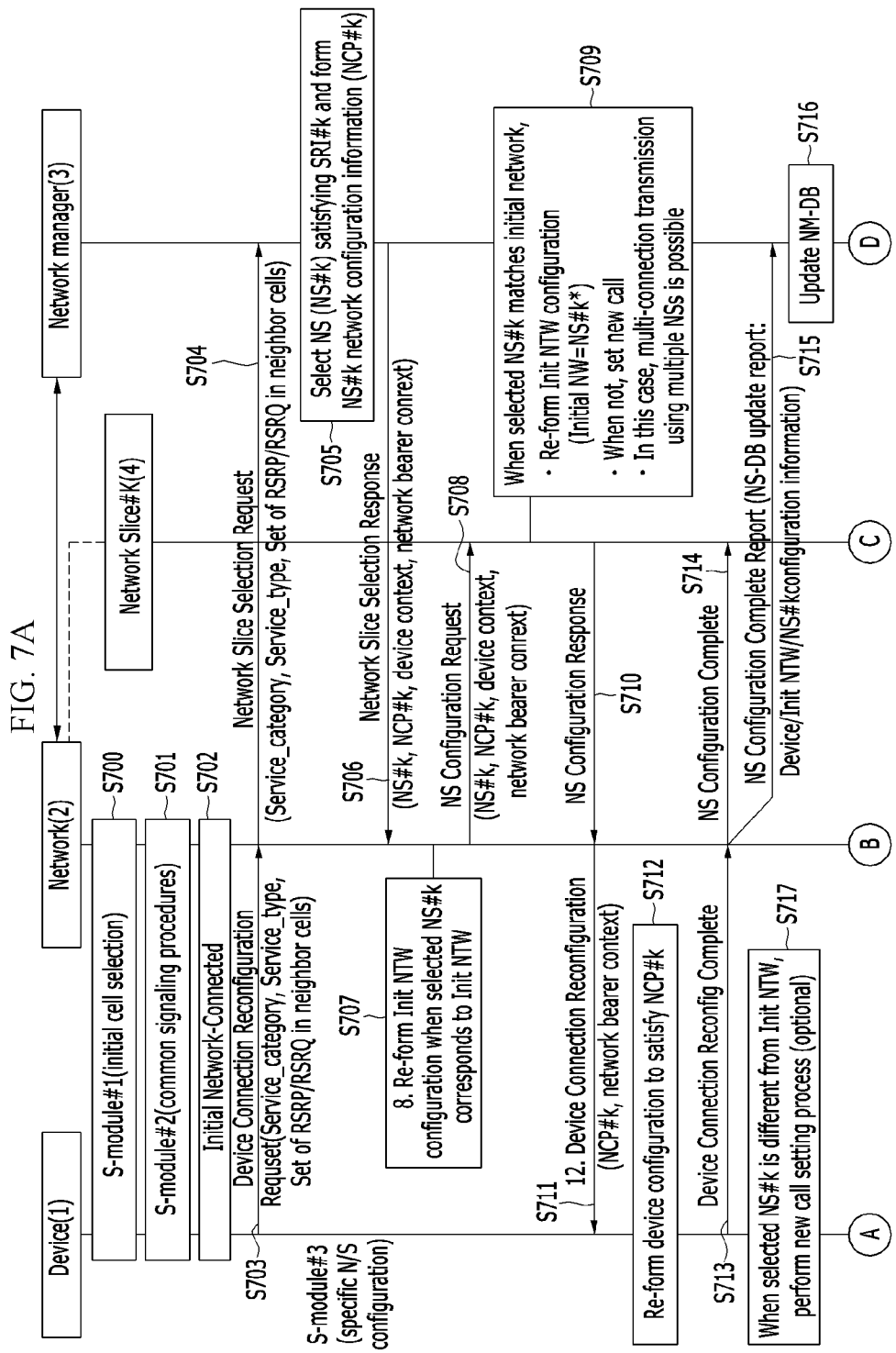
FIG. 7A and FIG. 7B show a flowchart of a method for selecting a network slice according to a service requirement of a device and configuring the same according to an exemplary embodiment of the present invention.
Figure 7B:
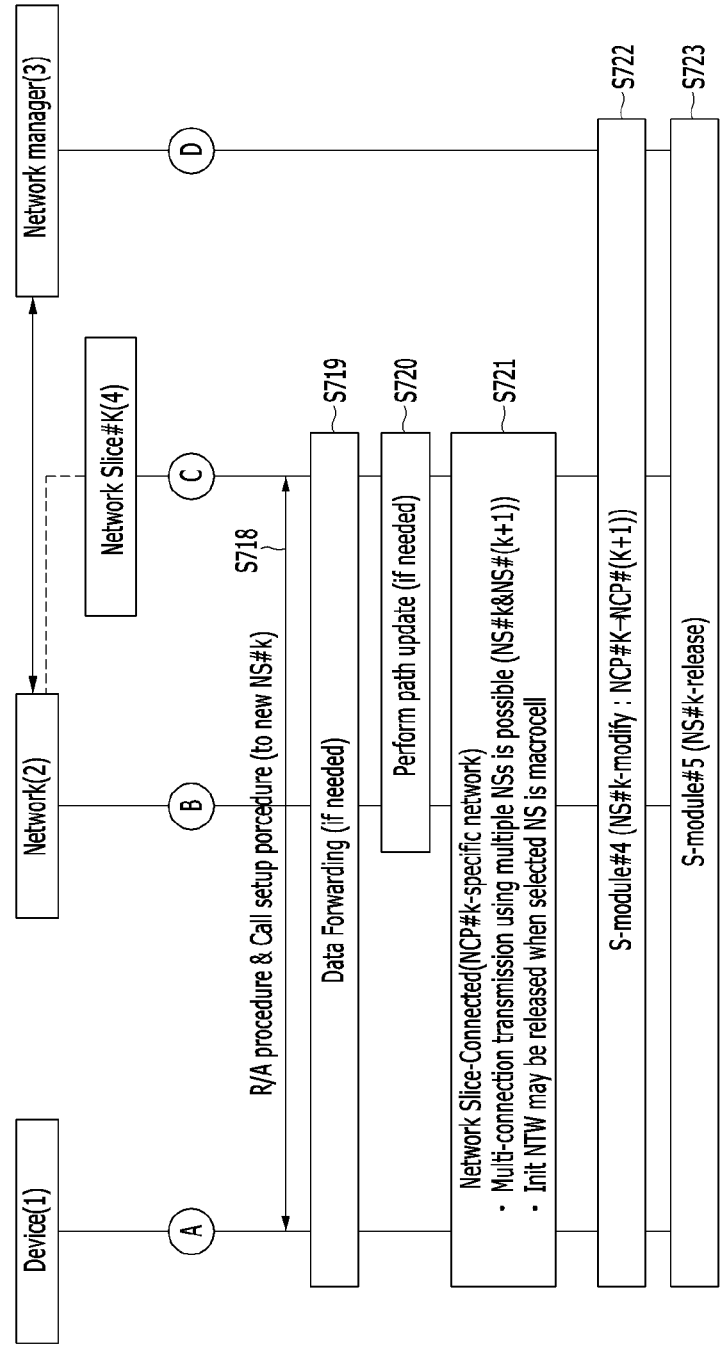

FIG. 7A and FIG. 7B show a flowchart of a method for selecting a network slice according to a service requirement of a device and configuring the same according to an exemplary embodiment of the present invention.

When the network slice is selected according to the service requirement of the device, as shown in FIG. 7A, the device 1 performs an initial cell selection and performs a common signaling procedure (S700 and S701), and the device is accessed to a network 2 (an initial network or a network slice#0, and for convenience of description, referred to as an initial network) in an earlier stage of call setting (S702).

When the service requirement of the device (D#k) is transmitted to the network manager (NM) 3 through the initial network 2, the network manager (NM) determines the optimized network slice (NS#k) satisfying the service requirement and forms configuration information (NCP#k, Network Control Protocol) of the determined optimized network slice.

In detail, the device 1 includes a service requirement (SRI#k, Service Requirements Indicator) and received signal intensity measurement information elements (set of measurement reports in neighbor cells; for example, RSRP (Reference Signal Received Power) and RSRQ (Reference Signal Received Quality)) of the adjacent networks (including cells) into the device connection reconfiguration request message (DeviceConnectionReconfiguration Request) and transmits the same to the initial network 2 (S703). The service requirement (SRI#k) is a service requirement indicator (Service Requirements Indicator) for the user (case#k) of the device, and it includes information elements including {service category (Service_category), service type (Service_type)}.

The initial network 2 transmits the above-noted information included in the message provided by the device 1 to the network manager (NM) 3 through a network slice selection request message (NetworkSlice Selection Request) (S704). In this instance, the network slice selection request message (NetworkSlice Selection Request) may be triggered by not only the device but also by the initial network or the communicating network slice (NS#k) for the service requirement modification request (SRI#k→SRI#(k+1)). This triggering may be performed for the purpose of operational maintenance and management by the service provider and a network load balance, which is allowable since the network manager (NM) is connected to the initial network/network slice through an open interface. (Refer to the method for changing an access network slice and a core network slice shown in FIG. 6).

The network manager (NM) 3 uses the information included in the device connection reconfiguration request message (DeviceConnectionReconfiguration Request) and provided by the device, and subscriber registration information (e.g., QoS/billing) provided by the network, to determine the network slice (NS#k) satisfying the service requirement (SRI#k). For formation of the determined network slice (NS#k), configuration information such as functions or resources configuring the E2E path is set (S705). The configuration information for configuring the network slice (NS#k) may exemplarily include an NCP_type, a service priority, an E2E packet delay, a packet error rate, a packet data rate, an address resolution protocol (ARP), and radio frequency/antenna/modem/fronthaul/backhaul/server/router capability.

Here, the NCP_type may be classified as follows.

TABLE 1

| NCP_type | Notes |
|---|---|
| NCP(#1) | Broadband |
| NCP(#2) | Low_latency, LL |
| NCP(#3) | mMTC (massive_MTC) |
| NCP(#4) | cMTC (critical_MTC) |
| NCP(#5) | Best_effort |
| NCP(#k) | Etc. |

The NCP_type may be used with the same meaning of the service_type, which is variable by the service requirement. The service_type represents a service_type (e.g., including Enhanced Mobile Broadband (eMBB), ultra-reliable MTC (uMTC), massive MTC (mMTC), and best effort) classified by the service requirement characteristics such as a radio packet transmission speed, a radio packet delay, and a radio packet transmission error rate.

The network manager (NM) may include an NS-DB, and the NS-DB may store subscriber registration information, a service provider policy, network slice profile information specialized for user cases, and network control/management information. The network manager (NM) uses information stored in the NS-DB to newly determine a network slice satisfying the service requirement (SRI#k) and set configuration information on the resource/function of the network slice.

The network slice (NS#k) newly determined by the network manager (NM) according to the service requirement (SRI#k) may correspond to the currently connected initial network. The resource/function configuration information on the E2E path may be reconfigured according to the provided network slice configuration information (NCP#k).

After the stage of S705, the network manager (NM) 3 includes network slice selection information (NS#k) satisfying the service requirement (RI#k) and network configuration information (NCP#k) on the selected network slice into the network slice selection response message (NetworkSlice Selection Response), and transmits the same to the initial network 2 (S706). Here, the network manager (NM) 3 may transmit the network slice selection response message (NetworkSlice Selection Response) to the network slice (NS#k) through the open interface connected to a section of the network manager (NM) and the network slice (NS#k).

The configuration of the network slice is formed according to the network slice (NCP#k) set by the network manager (NM).

In detail, the initial network 2 receives a network slice selection response message (NetworkSlice Selection Response) from the network manager (NM) 3, and when the predetermined network slice (NS#k) corresponds to the initial network (NS#k=Initial NW), it may reset configuration information on the function/resource on the E2E path for configuring the initial network to satisfy network configuration information (NCP#k). For example, configuration information of the initial network including RF/antenna/modem, fronthaul/backhaul/router function, and position and performance of the edge server may be reset to satisfy network configuration information (NCP#k) (S707).

When the predetermined network slice (NS#k) is different from the initial network (NS#k≠Init NW), the initial network 2 transmits the network slice configuration request message (NS Configuration Request) to the corresponding network slice (NS#k) (S708). In this case, the network manager (NM) 3 may transmit the network slice selection response message (NetworkSlice Selection Response) to the network slice (NS#k) through the open interface connected in the section of the network manager (NM) and the network slice (NS#k). In this instance, the network slice configuration request message (NS Configuration Request) by the initial network is not transmitted to the network slice (NS#k).

After this, a new call setting process (e.g., random access, call admission control, and allocation of a radio bearer) is performed between the device and the network slice (NS#k), and function/resource configuration information on the E2E path for configuring the network slice (NS#k) is reset to satisfy network configuration information (NCP#k) (S709). For example, configuration information of the network slice (NS#k) including antenna/modem, fronthaul/backhaul/router function, and position and performance of the edge server may be set to satisfy network configuration information (NCP#k). The currently used call setting process may use the existing signaling process (e.g., signaling for setting a call for the LTE), and a detailed description thereof will be omitted.

The network slice ((NS#k) transmits the network slice configuration response message (NS Configuration Response) to the initial network 2 (S710).

When the changes of the network slice are sequentially generated (NS#k→NS#(k+1)), the changing process may be performed in a like manner of the above-described process (Initial NW→NS#k). In this case, a multi-connection transmission using a plurality of network slices (e.g., NS#k and NS#(k+1)) is allowable without releasing the connected network slice (NS#k).

The configuration of the device is reconfigured according to the characteristic of the network configuration information (NCP#k) determined by the network manager (NM). For this purpose, the device connection reconfiguration message (DeviceConnectionReconfiguration) is transmitted to the device 1 from the initial network 2 (S711), and the device 1 reconfigures configuration (e.g., function, resource, or performance) of the device corresponding to the service requirement (SRI#k) (S712).

When the reconfiguration is completed, the device 1 transmits the device connection reconfiguration completion message (DeviceConnectionReconfiguration Complete) for notifying the completion to the initial network 2 (S713). The initial network 2 transmits a network slice configuration completion message (NS Configuration Complete) and a network slice configuration completion report message (NS Configuration Complete Report) to the network slice (NS#k) 4 and the network manager (NM) 3 respectively to notify the completion of reconfiguration of the device (S714 and S715). The network manager (NM) 3 updates the NS-DB for the configuration information (e.g., allocated wired/radio resource sizes) used by the network slice (NS#k) (S716).

When the network slice (NS#k) determined by the network manager (NM) is different from the initial network, a process for setting a new call between the device and the network slice (NS#k) may be performed after the stages of S706 to S710 (S717).

In detail, as shown in FIG. 7B, the device 1 receives a device connection reconfiguration message (DeviceConnectionReconfiguration) from the initial network 2, and the device 1 attempts to access the network slice (NS#k) through the process for setting a call. In this instance, the device 1 may receive information for random access from the initial network 2 to synchronize an uplink (S718).

When the call setting is completed, a process for forwarding data and updating a path (Data Forwarding & Path Update) is performed between the device 1 and the network slice (NS#k) (S719 and S720). When the access to the existing initial network is not maintained, the function and the resource used to the initial network and the connection between the device and the initial network are released.

When the processes are completed, the section between the device and the network slice (NS#k) enters a communication allowable state (e.g., referred to as a network slice-connected (Network Slice-Connected) state) satisfying network configuration information (NCP#k) (S721).

During communication between the device and the network slice (NS#k), the device (or an initial network or a network slice (NS#K)) may change the service requirement.

For example, when the network slice (NS#k) and the network configuration information (NCP#) are changed by the network manager (NM), the device performs a following operation.

The function element and the resource element for configuring the E2E path between the device and the network slice (NS#k) are dynamically reconfigured according to change information (NS#k→NS#(K+1), NCP#k→NCP#(k+1)) caused by the change of the network slice (NS#k) and the network configuration information (NCP#), and the state transits to the 'network slice-connected (Network Slice-Connected)' state. That is, the section between the device and the network slice (NS#(K+1)) enters the network slice-connected state satisfying the network configuration information (NCP#(k+1)) (S722). In this case, when communication release between the device and the network slice (NS#k) is requested by the network manager (NM) 3, the device and the network slice (NS#k) release the used function element and the resource element (S723).

The above-described procedure is applicable to the hierarchical cell structure (HCS) cell environment configured with a single-RAT or multi-RATs in the mobile/radio communication network.

The above-described procedure may configure a network slice selecting and supporting function by the network manager (NM) at initial network equipment installation.

Figure 8A:
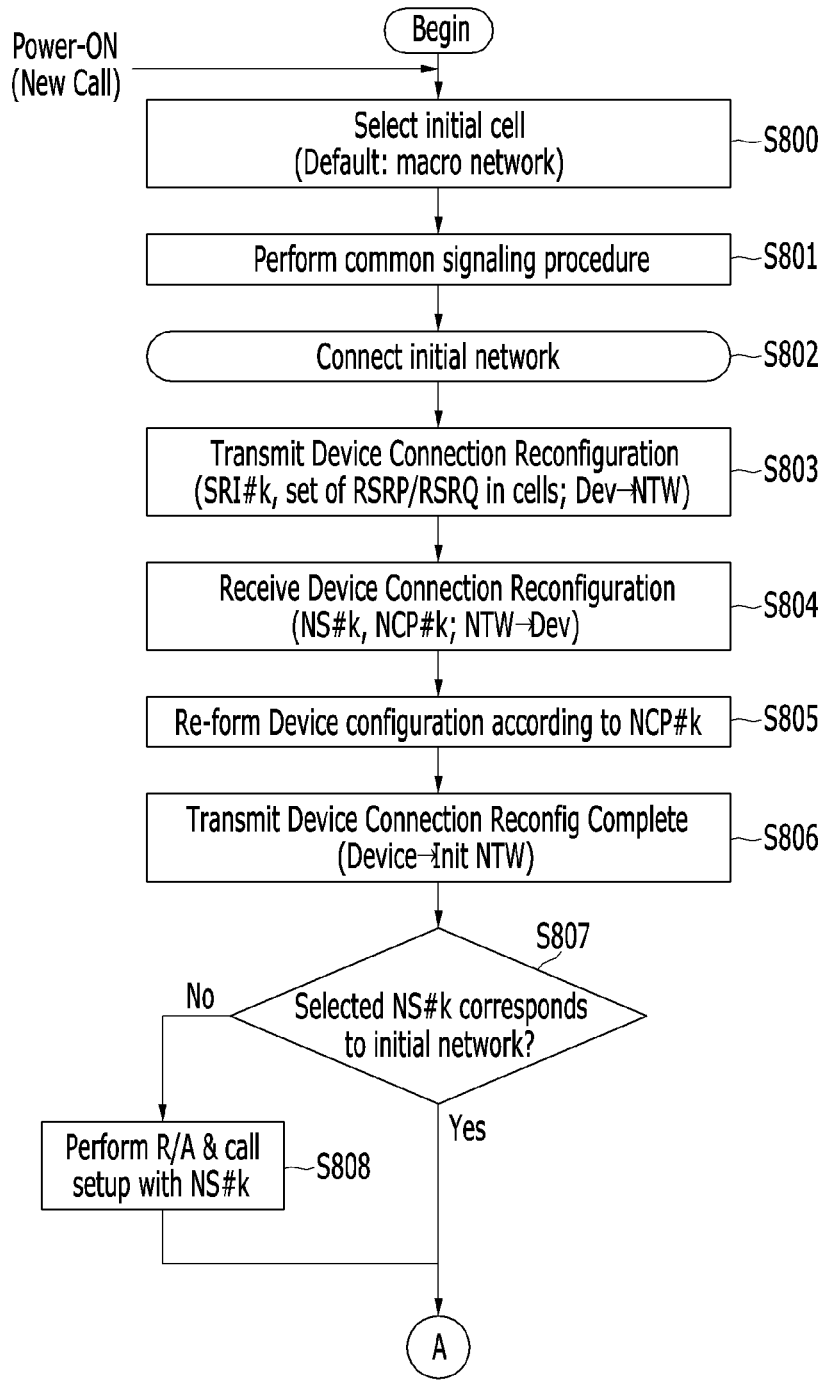
FIG. 8A and FIG. 8B show a flowchart for showing an operation of a device in a method for selecting a network slice according to a service requirement and configuring the same according to an exemplary embodiment of the present invention.
Figure 8B:
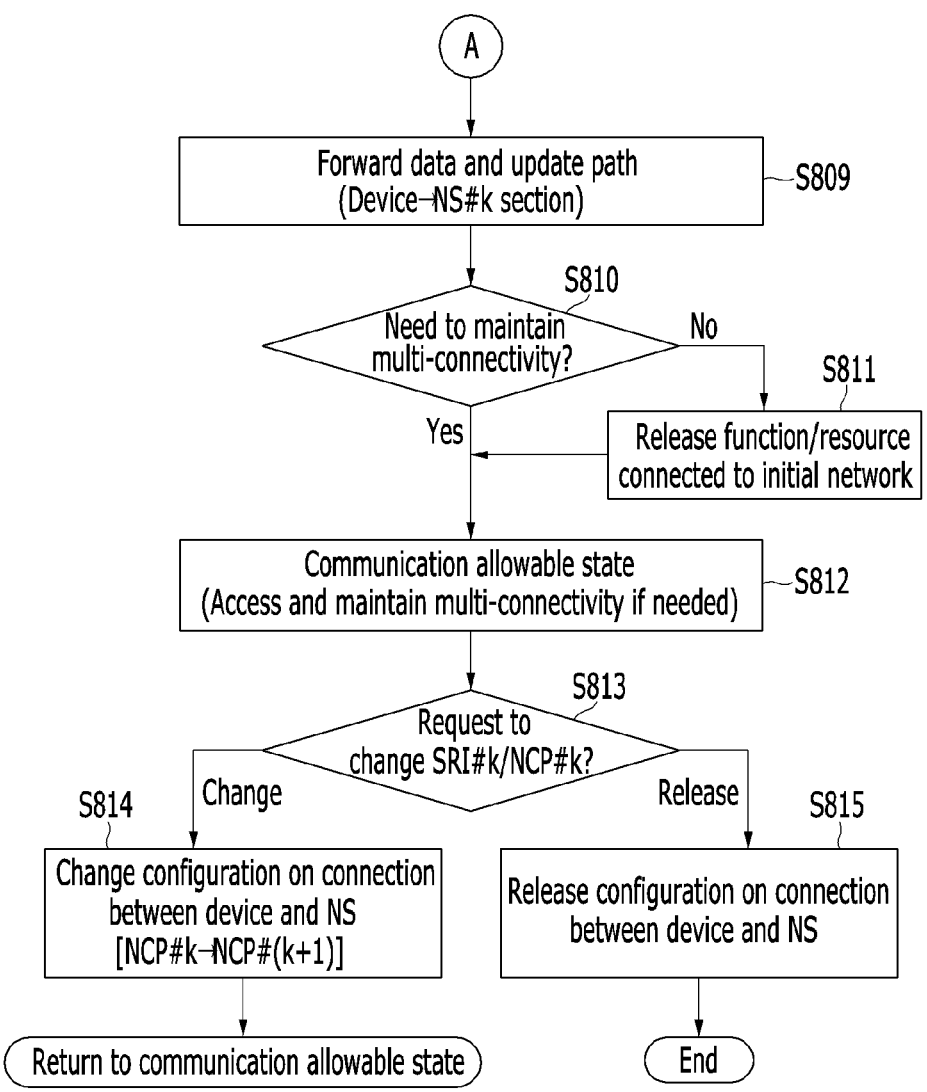

FIG. 8A and FIG. 8B show a flowchart for showing an operation of a device in a method for selecting a network slice according to a service requirement and configuring the same according to an exemplary embodiment of the present invention.

A process performed in the above-described method for selecting and configuring a network slice will now be described on the side of the device, and the same portions as in the above-provided descriptions will be omitted.

As shown in FIG. 8A, at the initial call setting, the device is accessed to the network (initial network or network slice#0, for convenience of description, referred to as an initial network) (S800-S802). While accessed to the initial network (Initial Network-Connected), the device transmits the service requirement (SRI#k) and the received signal intensity measurement value information element (Set of measurement reports in neighbor cells, for example, RSRP, RSRQ, etc.) of adjacent networks (including cells) to the initial network. The information element is loaded onto a device connection reconfiguration request message (DeviceConnectionReconfiguration Request) and is then transmitted (S803).

The configuration of the device is reconfigured according to the network configuration information (NCP#k) information determined by the network manager (NM).

In detail, when receiving the device connection reconfiguration message (DeviceConnectionReconfiguration) from the network (S804), the device reconfigures the function of the device and the resource configuration according to the configuration information (NCP#k) on the network slice determined by the network manager (NM) (S805).

When the reconfiguration of the function of the device and the resource configuration is completed, the device transmits a device connection reconfiguration completion message (DeviceConnectionReconfiguration Complete) for notifying this to the network (S806).

When the network slice (NS#k) selected by the network manager (NM) is different from the existing initial network, the device performs a process for setting a new call with the network slice (NS#k) (S807).

When receiving the device connection reconfiguration message (DeviceConnectionReconfiguration) from the initial network, the device attempts access to the network slice (NS#k) through the process for setting a call. In this instance, the device receives a random access and call setting information from the network to perform a call setup process (S808).

When the call setup is completed, as shown in FIG. 8B, the process for forwarding data and updating a path may be performed between the device and the network slice (NS#k) (S809). When the existing access to the initial network is not maintained, the connection between the device and the initial network is released (S810 and S811).

When the procedure is completed, the section of the device and the network slice (NS#k) enters a communication allowable state (Network Slice-Connected) satisfying network configuration information (NCP#k) (S812).

The initial network or the network slice (NS#K) may change the service requirement. In this case, when the service requirement indicator is changed (SRI#k→SRI#(k+1)), network configuration information (NCP#k) is changed by the corresponding network manager (NM) (NCP#k→NCP#(k+1)) (S813), and the device is operated as follows.

The device reconfigures the function element and the resource element of the device according to the changed network configuration information (NCP#(k+1)) (S814), and returns to the state (Network Slice-Connected) to communicate with the network slice.

When a communication release is requested from the initial network or the device, the function element and the resource element used in the initial network are released (S815).

FIG. 9A and FIG. 9B show a flowchart for showing an operation of a network in a method for selecting a network slice according to a service requirement and configuring the same according to an exemplary embodiment of the present invention.

A procedure performed in the described method for selecting a network slice and configuring the same will be described on the side of the network, and the same portions as in the above descriptions will be omitted. The network may be the initial network (NS#0) accessed for the earliest time by the device at the initial stage of a call setting or the network slice (NS#k) satisfying network configuration information (NCP#k).

As shown in FIG. 9A, at the initial stage of call setting, access of the device and the network (initial network or network slice#0) is performed (S900-S901). When receiving a device connection reconfiguration request message (DeviceConnectionReconfiguration Request) from the device (S902), the network transmits information included in the message provided by the device to the network manager (NM) through a network slice selection request message (NetworkSlice Selection Request) (S903).

The network receives a network slice selection response message (NetworkSlice Selection Response) including network slice selection information (NS#k) satisfying the service requirement and network configuration information (NCP#k) on the selected network slice from the network manager (NM) (S904).

When the network slice (NS#k) included in the message provided by the network manager (NM) is a currently served initial network, the network reconfigures the configuration of the existing initial network. In detail, when the network slice (NS#k) selected by the network manager (NM) corresponds to the initial network (NS#k=Initial NW), the network reconfigures the configuration (e.g., function and resource) of the existing initial network according to an NCP_type included in the network configuration information (NCP#k) (S905 and S906).

When the NCP_type is the same type (BB-type) as the UHD mobile TV, the function element and the resource element appropriate for the type are selectively configured. That is, the configuration of the network is reconfigured according to the network configuration information (NCP#k) (S907). In detail, among the function elements of the initial network, not only a waveform scheme (e.g., Filter Bank Multi-Carrier (FBMC) or a radio frame structure (e.g., medium TTI)) and a random access scheme (e.g., noncompetition-based random access) but also a carrier frequency (e.g., carrier aggregation in cellular and mmWave bands) and processing performance of a router configuring the fronthaul/backhaul networking may be selectively reconfigured. Further, regarding the resource element between the device and the server, the RF/antenna/modem and fronthaul/backhaul/router capability are designed and disposed to fit the packet transmission speed, the packet error rate, and the E2E delay level required by the NCP_type. In the case of providing a UHD mobile TV service, the UHD server may be disposed on a position of a general central server.

When the NCP_type is the same type (LL-type) as the Cloud game, V2X, the configuration of the initial network is reconfigured according to the network configuration information (NCP#k) so as to selectively configure the appropriate function element and resource element (S908). In detail, from among the function elements of the initial network, not only the waveform scheme (e.g., Universal Filtered Multi-Carrier (UFMC), radio frame structure (e.g., short TTI), and random access scheme (e.g., quick access scheme)) but also the processing performance/port number of the router configuring the fronthaul/backhaul networking for achieving the E2E low-latency performance may be selectively reconfigured. Further, regarding the resource element between the device and the server, the fronthaul/backhaul networking with massive-latency performance is configured to fit the E2E latency level, and fast router capability is configured and disposed. The V2X server may be disposed on the edge server provided near a base station.

When the NCP_type is a type (Massive Connectivity (MC)_type) like a smart-meter, the configuration of the initial network is reconfigured according to the network configuration information (NCP#k) so as to selectively configure the appropriate function element and the resource element (S909). For example, a connection-less connection configuration may be made, and mobility/IMS server access exclusion may be performed.

Regarding the NCP_types other than the above-described NCP_types, the function element and the resource element that are appropriate for the corresponding type may be selectively configured according to the network configuration information (NCP#k).

In the stage of S705, when the network slice (NS#k) selected by the network manager (NM) is different from the initial network, the initial network NS#0 transmits a slice configuration request message (NS Configuration Request) to the corresponding network slice (NS#k) (S910) as shown in FIG. 9B, and receives a network slice configuration response message (NS Configuration Response) in response to it (S911).

When the initial network configuration of the stages (S907-S909) is completed or the network slice configuration response message (NS Configuration Response) is received, the configuration of the device is reconfigured according to the characteristic of the network configuration information (NCP#k) determined by the network manager (NM). The network transmits a device connection reconfiguration message (DeviceConnectionReconfiguration) to the device (S913), and receives a device connection reconfiguration completion message (DeviceConnectionReconfiguration Complete) from the device in response to it (S914).

The network transmits a network slice configuration completion message (NS Configuration Complete) and a network slice configuration completion report message (NS Configuration Complete Report) to the network slice (NS#k) and the network manager (NM) 3 to notify the fact that the device has completed the reconfiguration (S914 and S915). The section between the device and the network enters a communication allowable state (Network Slice-Connected) (S916).

During communication with the device, the device (or the network) may change the service requirement. When the service requirement indicator is changed (SRI#k→SRI#(k+1)), network configuration information is changed by the related network manager (NM) (NCP#k→NCP#(k+1)) (S917), and the network is operated as follows.

The network reconfigures the function element and the resource element of the network according to the changed network configuration information (NCP# (k+1)), and returns to the state to communicate with the network slice (Network Slice-Connected) (S918). When a communication release is requested from the network or the device, the function element and the resource element used in the network are released (S919).

Figure 10B:
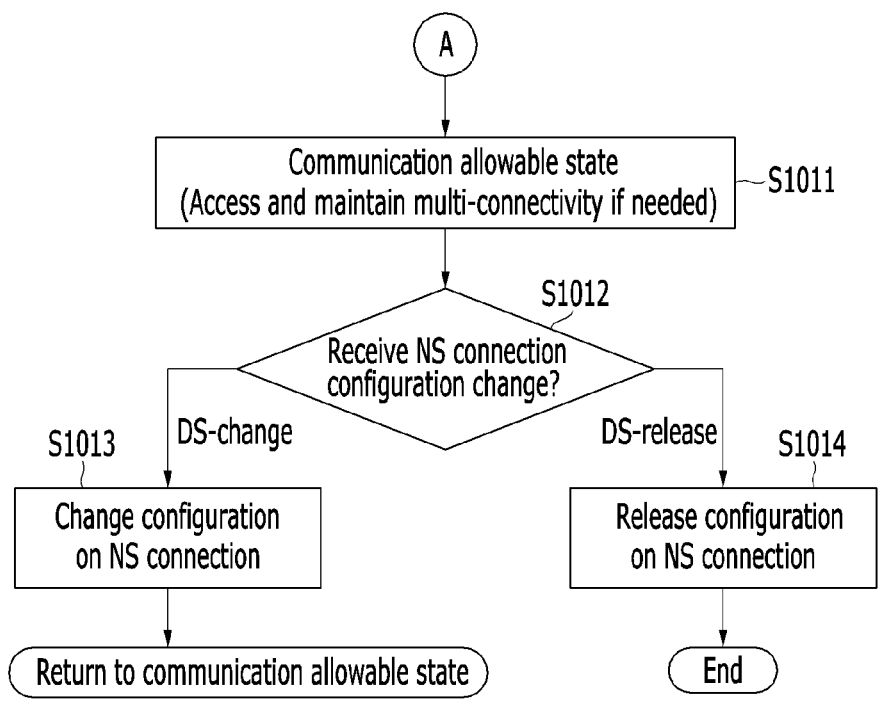

FIG. 10A and FIG. 10B show a flowchart for showing an operation of a network slice (NS#k) in a method for selecting a network slice according to a service requirement according to an exemplary embodiment of the present invention.

A procedure performed in the above-described method for selecting a network slice will now be described on the side of the network slice (NS#k), and the same portions as in the above-provided descriptions will be omitted. Here, the network slice (NS#k) will always be managed by the network manager (NM) and will always be in the communication allowable state (Active state).

When the network slice (NS#k) selected by the network manager (NM) receives a network slice configuration request message (NS Configuration Request) from the initial network as shown in FIG. 10A (S1000), it forms a configuration of the network slice (NS#k).

The network slice (NS#k) determines whether to receive a new call (S1001), and when it cannot receive a new call, it rejects the corresponding call (S1002) and returns to the beginning stage. When it can receive a new call, the configuration of the network slice (NS#k) is formed according to the NCP_type included in the network configuration information (NCP#k) of the network slice configuration request message (NS Configuration Request) (S1003).

When the NCP_type is a type (BB-type) like the UHD mobile TV, an appropriate function element and a resource element are selectively configured. That is, the configuration of the network is re-formed according to the network configuration information (NCP#k) (S1004). In detail, from among the function elements of the initial network, not only a waveform scheme (e.g., FBMC), a radio frame structure (e.g., medium TTI), and a random access scheme (e.g., non-contention-based random access), but also a carrier frequency (e.g., frequency integration of cellular and mmWave bands) and processing performance of the router configuring the fronthaul/backhaul networking, may be selectively reconfigured. Further, regarding the resource element between the device and the server, the RF/antenna/modem and fronthaul/backhaul/router capability are designed and disposed to fit the packet transmission speed, the packet error rate, and the E2E latency level required by the NCP_type. In the case of providing a UHD mobile TV service, the UHD server may be disposed on a position of a general central server.

When the NCP_type is a type (LL-type) like a Cloud game, V2X, the configuration of the initial network is re-formed according to the network configuration information (NCP#k) so as to selectively configure the appropriate function element and the resource element (S1005). In detail, from among the function elements of the initial network, not only a waveform scheme (e.g., UFMC), a radio frame structure (e.g., short TTI), and random access scheme (e.g., quick access scheme) but also processing performance/port number of the router configuring the fronthaul/backhaul networking for achieving E2E low latency performance may be selectively reconfigured. Further, regarding the resource element between the device and the server, fronthaul/backhaul networking with massive latency performance is configured and fast router capability is configured and disposed so as to fit the E2E latency level. The V2X server may be disposed on the edge server provided near the base station.

When the NCP_type is a type (massive connectivity (MC)_type) like the smart-meter, the configuration of the initial network is re-formed according to network configuration information (NCP#k) so as to selectively configure the function element and the resource element (S806). For example, the connection-less connection configuration and the mobility/IMS server access exclusion may be performed.

Regarding the NCP_types other than the above-described NCP_types, the function element and the resource element that are appropriate for the corresponding type may be configured according to the network configuration information (NCP#k).

When the configuration of the network slice (NS#k) is completed, a network slice configuration response message (NS Configuration Response) for notifying the completion is transmitted to the initial network (S1007).

When receiving a device connection reconfiguration completion message (DeviceConnectionReconfig Complete) from the initial network (S1008), the network slice (NS#k) attempts a new access to the device. A call setting process is performed between the network slice (NS#k) and the device after undergoing a random access process (S1009). In this instance, the network slice (NS#k) may receive information elements (e.g., random access information, device context, network bearer context, NCP#k, etc.) for setting a call.

When the call setting is completed, a process for forwarding data and updating a path is performed between the network slice (NS#k) and the device (S1010). When access to the existing initial network is not needed, the function and the resource used in the initial network and the connection between the device and the initial network are released.

When the above-described process is completed, as shown in FIG. 10B, the section between the network slice (NS#k) and the device enters a communication allowable state (Network Slice-Connected) satisfying the network configuration information (NCP#k) (S1011).

The device (or an initial network or a network slice (NS#k)) may change the service requirement. When the service requirement indicator is changed (SRI#k→SRI#(k+1)), the network configuration information is changed by the network manager (NM) (NCP#k→NCP#(k+1)), and the network slice (NS#k) is operated as follows (S1012).

The network slice (NS#k) reconfigures the function element and the resource element of the network slice (NS#k) according to the changed network configuration information (NCP#(k+1)), and the device returns to the communication allowable state (Network Slice-Connected) (S1013). In this instance, if needed, a size and a position of the resources (computing, storage, and networking resources) allocated to the network slice (NS#k) may be controlled. When a communication release is requested from the initial network, the device, or the network slice (NS#k), the function element and the resource element used in the network slice (NS#k) are released (S1014).

Figure 11:
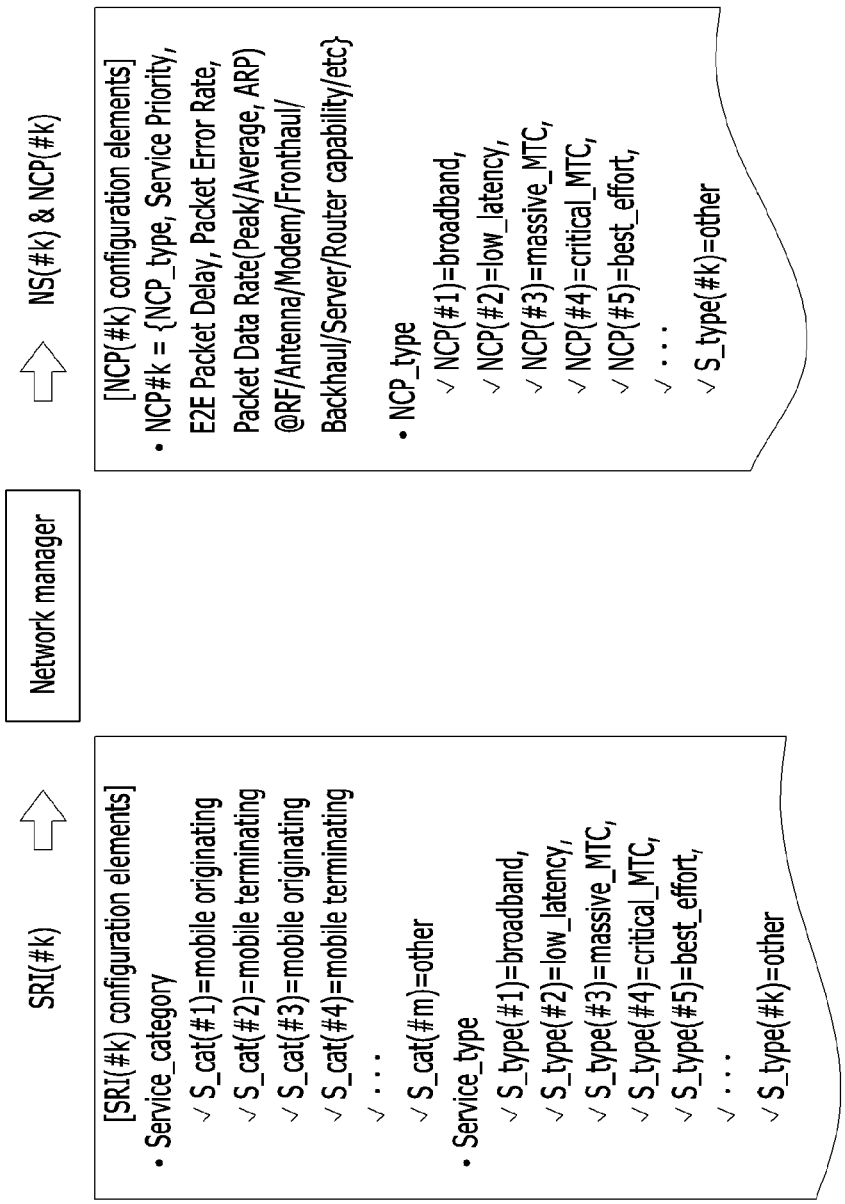
FIG. 11 shows a process for a network manager to select a network slice according to a service requirement according to an exemplary embodiment of the present invention.

FIG. 11 shows a process for a network manager to select a network slice according to a service requirement according to an exemplary embodiment of the present invention.

The network manager (NS) includes an NS-DB, and the NS-DB includes subscriber registration information, service provider policy information, user case-specific network slice category function/resource configuration information, and network control/management information (e.g., SON (Self Organizing Networks)/RRM (Radio Resource Management)/CRS(Certification Remote System)). The network manager (NM) may be provided together with a hardware node (e.g., PDN-gateway, SDN controller) inside the core network in the mobile communication network, or may be provided on the network O&M center managed by the service provider, and they may be realized as a high-speed server with large capacity.

As shown in FIG. 11, the network manager (NM) uses information elements included in the service requirement (SRI#k) to determine the optimized network slice (NS#k) satisfying the information elements, and forms configuration information (NCP#k) of the determined optimized network slice.

FIG. 12 shows an exemplary diagram for showing configuration information of a network slice according to an exemplary embodiment of the present invention.

In a like manner of the example shown in FIG. 12, the network manager (NM) may form configuration information for formation of the corresponding network slice for the respective different network slices. Regarding the optimized network slice (NS#k), configuration information for formation of the network slice (NS#k) including an NCP_type, a service priority, an E2E packet latency, a packet error rate, and a packet data rate may be configured.

Figure 13:
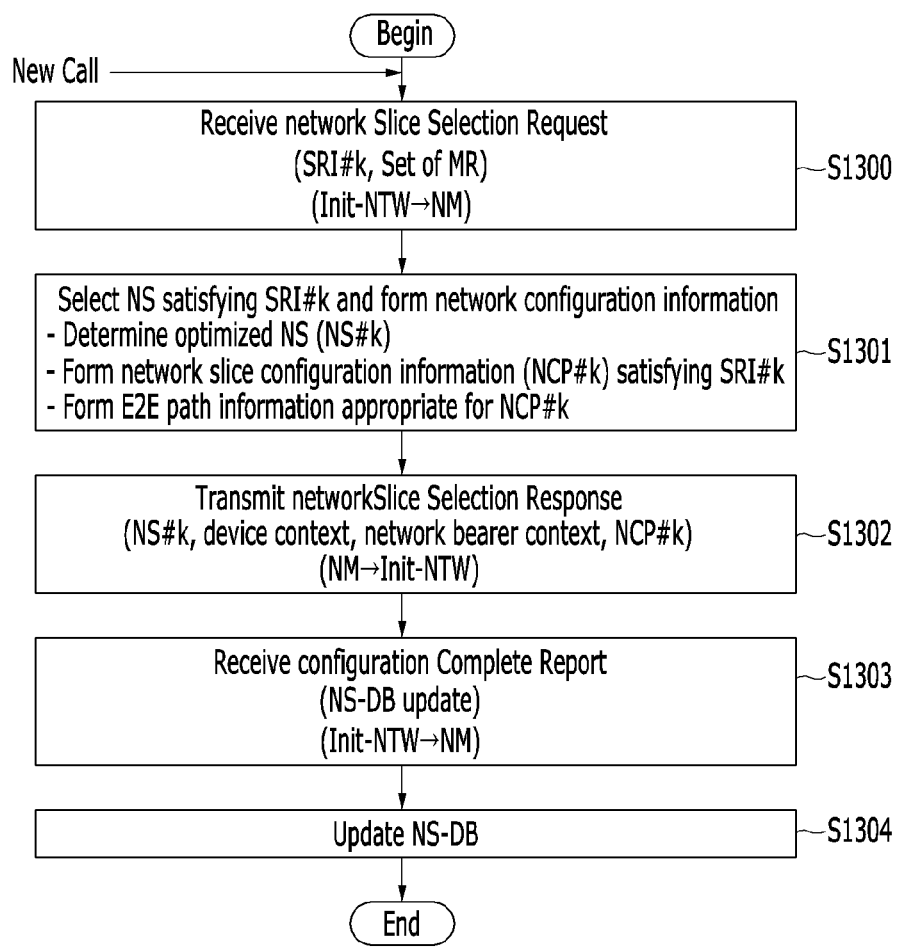
FIG. 13 shows a flowchart for showing an operation of a network manager in a method for selecting a network slice according to a service requirement according to an exemplary embodiment of the present invention.

FIG. 13 shows a flowchart for showing an operation of a network manager (NM) in a method for selecting a network slice according to a service requirement according to an exemplary embodiment of the present invention.

A procedure performed in the above-described method for selecting a network slice will now be described on the side of the network manager (NM), and the same portions as in the above-provided descriptions will be omitted.

The network manager (NM) receives a network slice selection request message (NetworkSlice Selection Request) including a service requirement (SRI#k) of the device from the initial network (S1300), determines the optimized network slice (NS#k) according to the service requirement (SRI#k), and forms optimized network configuration information (NCP#k). In detail, the network manager (NM) considers the service requirement (SRI#k) provided by the device, received signal intensities of cells provided near the device, and subscriber registration information (e.g., quality of service (QoS)/billing information) provided by the network to select the network slice (NS#k) satisfying the service requirement (SRI#k) required by the device, and forms configuration information (NCP#k) for formation of the selected network slice (NS#k) (S1301). Here, the service requirement (SRI#k) is a service requirement indicator of the device, and includes information elements such as {service_category, service_type}.

The network manager (NM) transmits a network slice selection response message (NetworkSlice Selection Response) including selected network slice information (NS#k) and network configuration information (NCP#k) to the initial network (S1302). The network configuration information (NCP#k) is function/resource information of the selected network slice, and it is a network slice configuration profile (Network slice_specific_capability_function_Configuration Profile) generated by synthesizing the service requirement indicator (SRI#k) of the device, received signal intensities of cells provided near the device, and device subscriber registration information of the network and determined by the network manager (NM). (Refer to FIG. 11 and FIG. 12).

The service requirement indicator (SRI#k) and the network configuration information (NCP#k) may add or remove the information element in linkage to the key capability indicator of the mobile communication network. The key capability indicator of the mobile communication network may include a user experienced data rate, a packet data rate (e.g., a packet data rate of a cell in a large capacity level), latency (e.g., latency of the E2E path in the low latency level), a connection density (a connection level of the device, massive connectivity), energy efficiency, spectrum efficiency, and area traffic capacity.

The network manager (NM) maintains and manages function/resource information between the device and the initial network/network slice (NS#k) according to the characteristic of the network configuration information (NCP#k).

When the initial network reports the fact that the reconfiguration of the network is completed and the state/function/resource information between the device and the initial network/network slice (NS#k) through a network slice configuration completion report message (NS Configuration Complete Report) (S1303), the network manager (NM) updates the NS-DB. The network slice (NS#k) transmits the state/function/resource information of the network slice (NS#k) to the network manager (NM) through the initial network. Based upon this, the network manager (NM) updates the NS-DB for the function configuration information (e.g., execution code_IDs for respective function elements) used by the network slice (NS#k) and the wire/radio resources (S1304).

Figure 14:
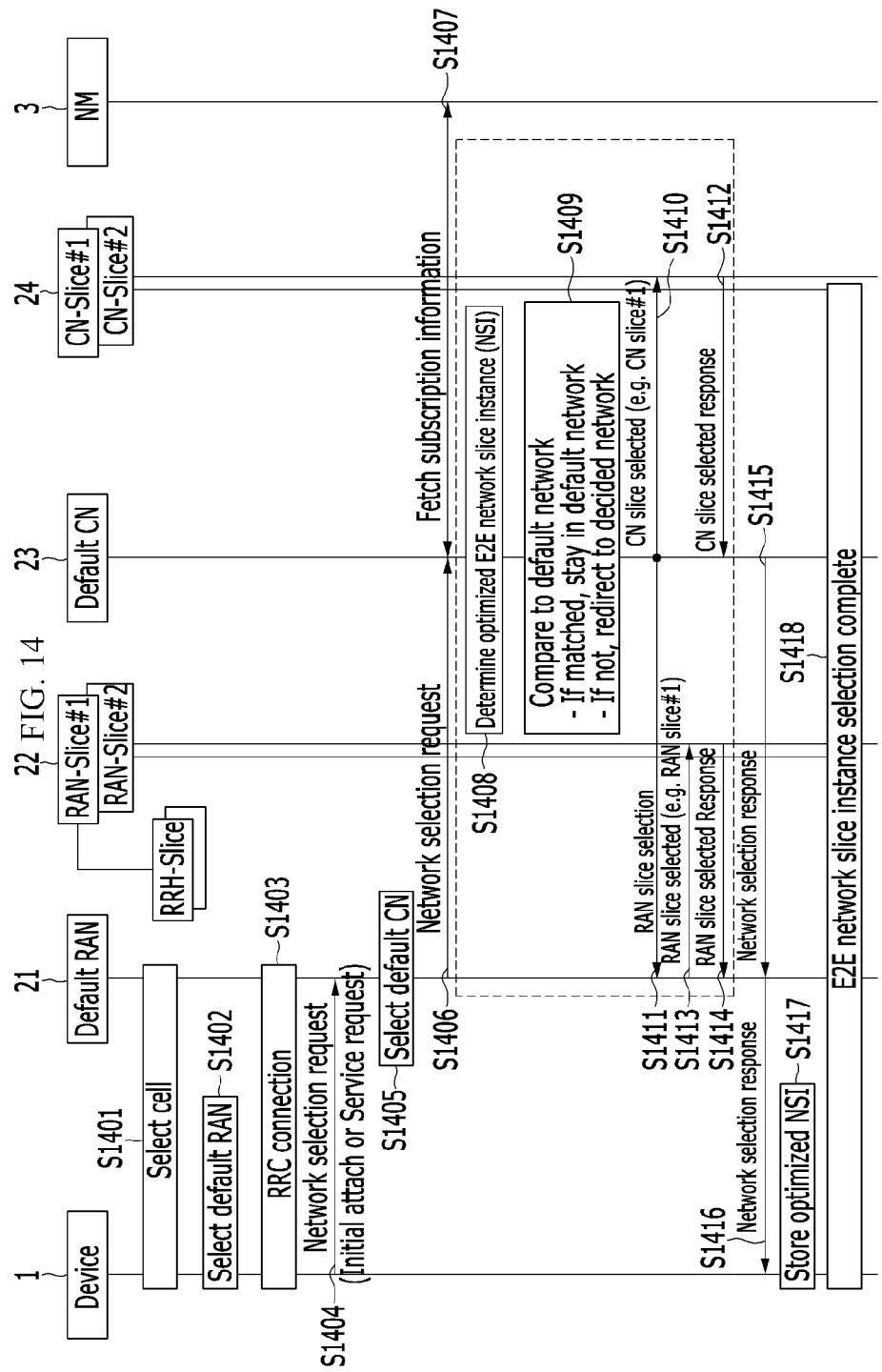
FIG. 14 shows a flowchart of a method for selecting a network slice according to a service requirement of a device and configuring the same according to another exemplary embodiment of the present invention.

FIG. 14 shows a flowchart of a method for selecting a network slice according to a service requirement of a device and configuring the same according to another exemplary embodiment of the present invention.

Regarding the communication network system with the structure shown in FIG. 4 and FIG. 5, the RAN slice and the CN slice fitting the service type (or service requirement) are determined by the default core network (default CN), the default access network (default RAN), and the default core network (default CN), the RAN slice and the CN slice fitting the service type are selected according to the determination, and the network slice is configured by the combination of the selected RAN slice and CN slice.

In detail, when information needed to select the RAN slice is not provided, the device 1 selects the default access network (default RAN) 21 as a default (S1401). The default access network (default RAN) 21 may correspond to a macro-cell base station installed in the entire communication area in a like manner of the enhanced LTE or a macro-cell base station of the new radio (5G).

The device 1 performs cell selection through the default access network (default RAN) 21, and sets a radio access (RRC connection) between the device and the access network (UE-RAN) (S1402 and S1403). The device 1 transmits a message such as an initial access (initial attach) or a service request to the selected default access network (default RAN) 21 (S1404). The service request message (Service request) may include a service type, device capability (UE capability), device context (UE context), and device position (UE location) information.

When information needed to select the CN slice is not provided, the default access network (default RAN) 21 selects the default core network (default CN) 23 as a default (S1405), and transmits a network selection request (Network selection request) message to the selected default core network (default CN) 23 (S1406).

The default core network (default CN) 23 brings a subscriber profile including subscriber registration and authentication information from a subscriber data module (SDM) (S1407), and determines the network slice by using the subscriber profile information and the service type provided by the device 1 (S1408). In detail, the default core network (default CN) 23 determines the network slice instance (dedicated NSI) optimized for the service type requested by the device 1, and the optimized NSI includes a RAN slice instance (RAN slice) and a CN slice instance (CN slice).

The optimized NSI determined according to the service type is compared to the default network (including a default RAN and a default CN) selected at the initial call setting (S1409). When the configuration information of the resource and the function (network function) of the default network corresponds to the resource and the function of the optimized NSI, the device uses the initially set default network without changing it. On the contrary, when the configuration information of the resource and the function of the default network do not correspond to the resource and the function of the optimized NSI, the device uses the optimized NSI determined by the default core network (default CN) 23 to access the newly determined RAN slice and CN slice corresponding to the optimized NSI.

According to a comparison result of the optimized NSI and the default network, the default core network (default CN) 23 instructs the corresponding RAN slice (e.g., RAN slice#1) and CN slice (e.g., CN slice#1) to configure the corresponding resource (e.g., computing, storage, and networking) and the network function according to the service type. In detail, the default core network (default CN) 23 instructs the corresponding CN slice (e.g., CN slice#1) 24 to configure the resource and the function caused by the corresponding service type according to the optimized NSI (S1410). The default core network (default CN) 23 instructs the default access network (default RAN) 21 to select the RSN slice (e.g., RAN slice#1) corresponding to the optimized NSI, and instructs to configure the resource and the function caused by the corresponding service type (S1411).

The CN slice (e.g., CN slice#1) configures the resource and the function caused by the corresponding service type according to the instruction by the default core network (default CN) 23 and performs a completion report (S1412). The default access network (default RAN) 21 selects the RSN slice (e.g., RAN slice#1) corresponding to the optimized NSI according to the instruction by the default core network (default CN) 23, and instructs the selected RAN slice (e.g., RAN slice#1) 22 to configure the resource and the function caused by the corresponding service type (S1413), and the selected RAN slice (e.g., RAN slice#1) having completed the configuration of the resource and the function transmits a completion report to the default access network (default RAN) 21 (S1414).

For example, the RAN slice (e.g., RAN slice#1) configures the function (e.g., antenna/modem, fronthaul/backhaul/router capability, and edge server) fitting the service type requested by the device, and the CN slice (e.g., CN slice#1) configures the function (e.g., mobility management function, session management function, routing/forwarding function) fitting for the service type requested by the device.

After the resource/function of the RAN slice (e.g., RAN slice#1) corresponding to the optimized NSI and CN slice (e.g., CN slice#1) are configured to be appropriate for the service type, the default core network (default CN) 23 notifies the device 1 of this configuration (S1415 and S1416), and the device 1 stores information on the determined optimized NSI (S1417). Accordingly, the process for selecting the E2E network slice and configuring the same is finished (S1118). According to the process, the section among the device, the RAN slice (e.g., RAN slice#1), and the CN slice (e.g., CN slice#1) enters the communication allowable state (e.g., referred to as a network slice-connected (Network Slice-Connected) state) satisfying the network configuration information caused by the service type.

Regarding the method shown with reference to FIG. 14, the operation performed by the device may be performed in a like manner shown in FIG. 8A and FIG. 8B, and the operation performed by the default core network (default CN) may be performed in a like manner shown in FIG. 13.

Figure 15:
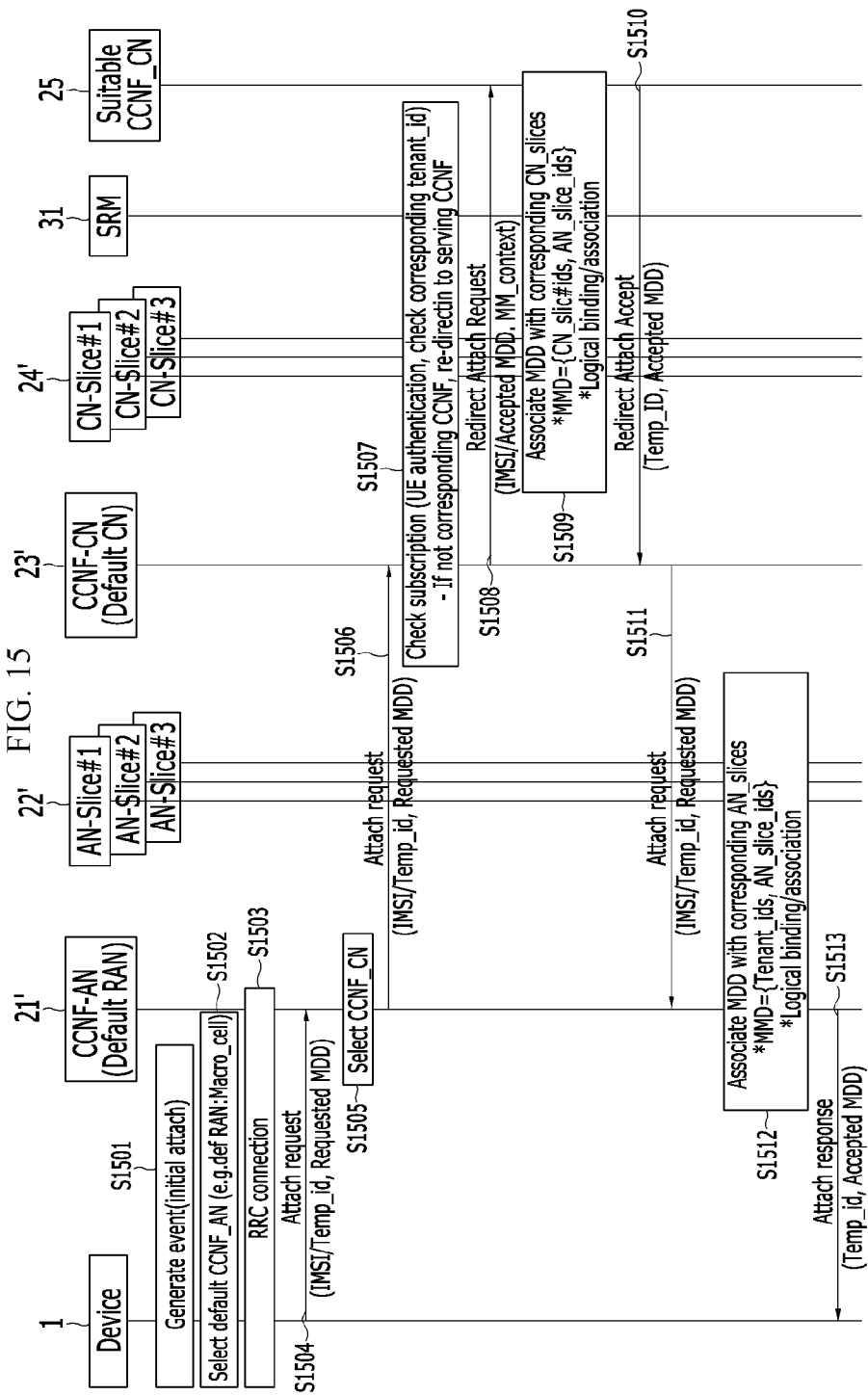
FIG. 15 shows a flowchart of a process for selecting a network slice and configuring the same when an initial attach is performed according to an exemplary embodiment of the present invention.

FIG. 15 shows a flowchart of a process for selecting a network slice and configuring the same when an initial attach is performed according to an exemplary embodiment of the present invention.

It is based on a communication network system with a structure described with reference to FIG. 4 and FIG. 5, and it provides a method for selecting a network slice and configuring the same during a process for a device to perform an initial access (initial attach). The initial access (initial attach) represents a logical connection process (a logical association) between a device and network slice (NSIs).

As shown in FIG. 15, at an event generation (e.g., initial attach), the device 1 selects a random access network (CCNF-AN in this case) 21' (S1501 and S1502). For example, the CCNF-AN 21' may be a macro-cell base station installed in the entire communication area or an adjacent macro-cell (or a macro-cell cluster) with the greatest received intensity from among the new radio (5G) macro-cell base stations.

The device 1 sets a radio access (RRC connection) between the device and the access network (UE-AN) (S1503), and transmits an access request message (Attach request) to the access network that is CCNF-AN 21' (S1504). The access request message (Attach request) may include an International Mobile Station Identity (IMSI), a temporary identifier (Temp_id), and a requested MDD (Multi-dimensional Descriptor). Here, the Temp_id represents routing information for the device to perform temporary mapping on the CCNF-AN, and the MDD may include (Temp_id, Slice_type). The Slice_type may include eMBB, CriC, and mIoT (mobile Internet of Things), and may correspond to the service type.

The CCNF-AN 21' selects a random core network (CCNF-CN) 23' (S1505), and transmits an access request message (Attach request) message to the selected CCNF-CN 23' (S1506).

The CCNF-CN 23' brings a subscriber profile including subscriber registration and authentication information from the SDM 31 and checks the Tenant_id (S1507). The Tenant_id represents a rental service provider identity number (Google, Amazon, etc.) borrowing the network slice (NS). The CCNF-AN 21' performs redirection to the corresponding CCNF or the corresponding CCNF-CN according to the Tenant_id. At the time of redirection, the CCNF-CN 23' transmits an IMSI, a requested MDD, and an MM_context to the suitable CNF-CN 25 (S1508).

Based upon the transmitted information, the CNF-CN 25 uses the Slice-type included in the MDD provided by the device 1 to determine the network slice (including the CN slice and the AN slice) (S1509). The CNF-CN 25 configures information corresponding to the CN slice 24' corresponding to the determined NSI, that is, an MDD, to transmit the same to the CCNF-CN 23' together with the Temp_id. Here, the MDD includes (CN_Slice#ids, AN_Slice#ids), and may be referred to as an "Accepted_MDD" (S1510).

The CCNF-CN 23' transmits the Temp_id and the Accepted_MDD provided by the CNF-CN 25 to the CCNF-AN 21' (S1511), and the CCNF-AN 21' determines the AN slice 22' corresponding to the Accepted_MDD (S1512). The CCNF-AN 21' configures information corresponding to the determined AN slice, that is, the MDD, and transmits the same to the device 1 together with the Temp_id. Here, the MDD includes (Temp_id, AN_Slice#ids) (S1513).

Figure 16:
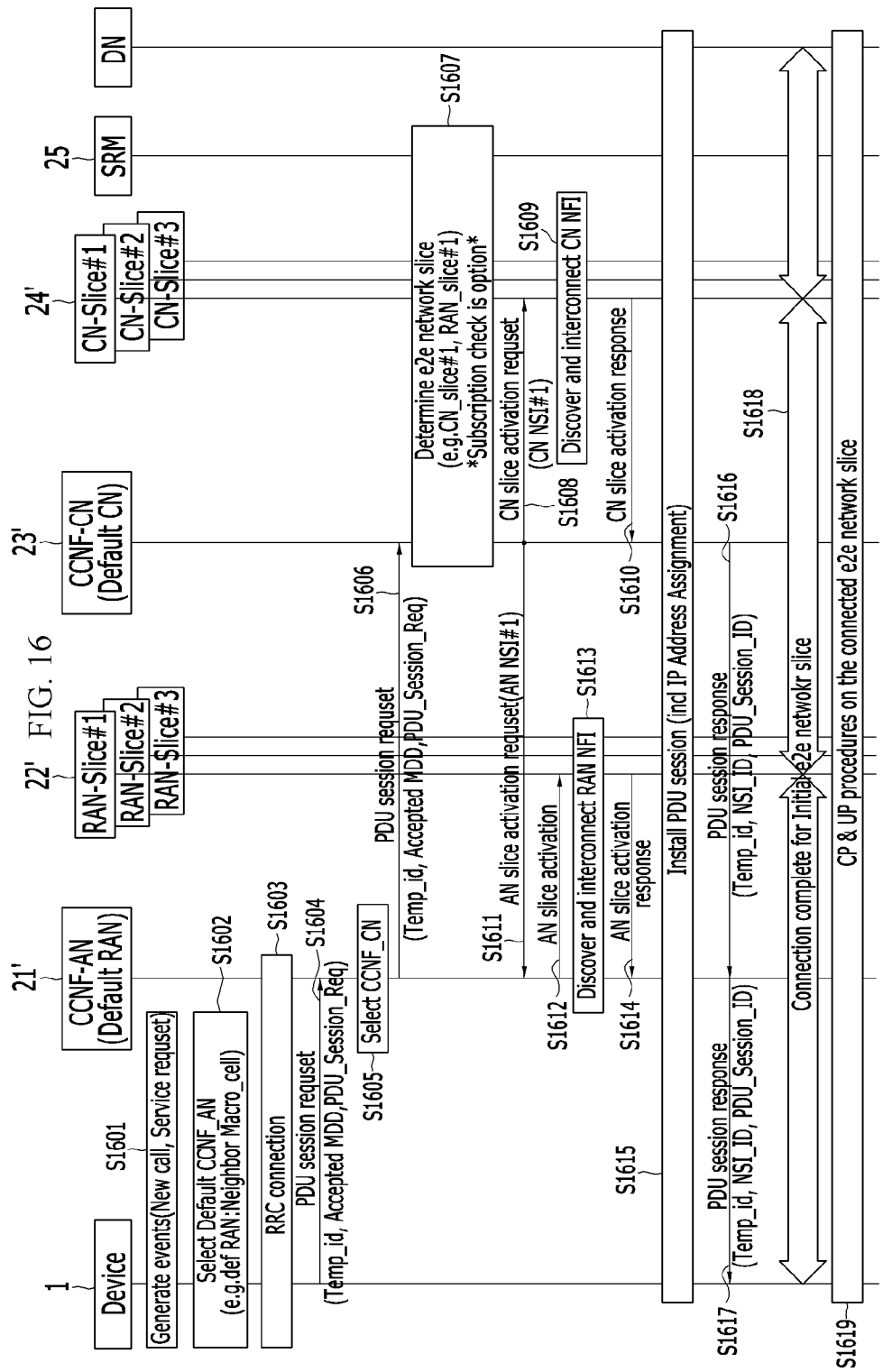
FIG. 16 shows a flowchart of a process for selecting a network slice and configuring the same according to a service request after an initial attach is performed according to an exemplary embodiment of the present invention.

FIG. 16 shows a flowchart of a process for selecting a network slice (e.g., finally selecting one of many network slices that are temporarily mapped in FIG. 15) and configuring the same according to a service request after an initial attach according to an exemplary embodiment of the present invention.

Here, the procedure for selecting a network slice according to a service request (Service request) and configuring the same represents a process for, in an initial access (Initial attach), selecting one NSI for the device to actually request a random service and communicate with from among the NSIs temporarily mapped by the device, discovering a network function instance (NFI) set (NSI=a set of NFIs) for configuring one selected NSI, and interconnecting the same (NFI discovery and Interconnection).

As shown in FIG. 16, at the generation of an event (e.g., a new call, a service request), the device 1 selects a default access network (CCNF-AN in this case) 21' (S1601 and S1602), sets a radio access (RRC connection) (S1603), and transmits a PDU session request to the CCNF-AN 21' (S1604). The PDU session request may include a temporary identifier (Temp_id), Accepted MDD (e.g., (Temp_id, AN_Slice#ids)), and a PDU_Session_Req.

The CCNF-AN 21' selects a core network (CCNF-CN) 23' (S1605), and transmits a PDU session request to the selected CCNF-CN 23' (S1606).

The CCNF-CN 23' determines the network slice based on the transmitted information, and in detail, it determines the RAN slice (e.g., RAN_clice#1) and the CN slice (e.g., CN Slice#1) (S1607). In this case, it may determine the network slice in additional consideration of the subscriber profile such as subscriber registration and authentication information provided by the SRM 31.

The CCNF-CN 23' transmits a CN slice activation request (CN slice activation request) to the determined CN slice (e.g., CN Slice#1 or CN NSI#1, 24') (S1608), and the CN slice (e.g., CN NSI#1) discovers the corresponding CN NFI and interconnects the same (S1609). This corresponds to configuring of the corresponding resource and the network function to the CN slice. The CN slice transmits a response (CN slice activation response) to the CN slice activation request to the CCNF-CN 23' (S1610).

Further, the CCNF-CN 23' transmits a RAN slice activation request (AN slice activation request) on the determined RAN slice (e.g., RAN Slice#1 or AN NSI#1) to the CCNF-AN 21' (S1611), and the CCNF-AN 21' instructs the RAN slice activation (AN slice activation) to the determined RAN slice (e.g., AN NSI#1, 22') (S1612). The RAN slice (e.g., AN NSI#1) discovers the corresponding RAN NFI and interconnects it (S1613). This corresponds to the configuring of the corresponding resource and the network function to the RAN slice. The RAN slice (e.g., AN NSI#1) transmits a response (AN slice activation response) to the AN slice activation to the CCNF-AN 21' (S1614). Therefore, establishment of the PDU session is finished (S1615).

The CCNF-CN 23' transmits a response (PUD session response) to the PDU session request by the device to the device 1 through the CCNF-AN 21' (S1616 and S1617). The PDU session request response (PUD session response) may include a Temp_id, an NSI_ID, and a PDU_Session_ID.

Through the procedure, the initial network slice-connection is finished (S1618), and the CP and UP process through the connected E2E network slice is performed (S1619).

Figure 17:
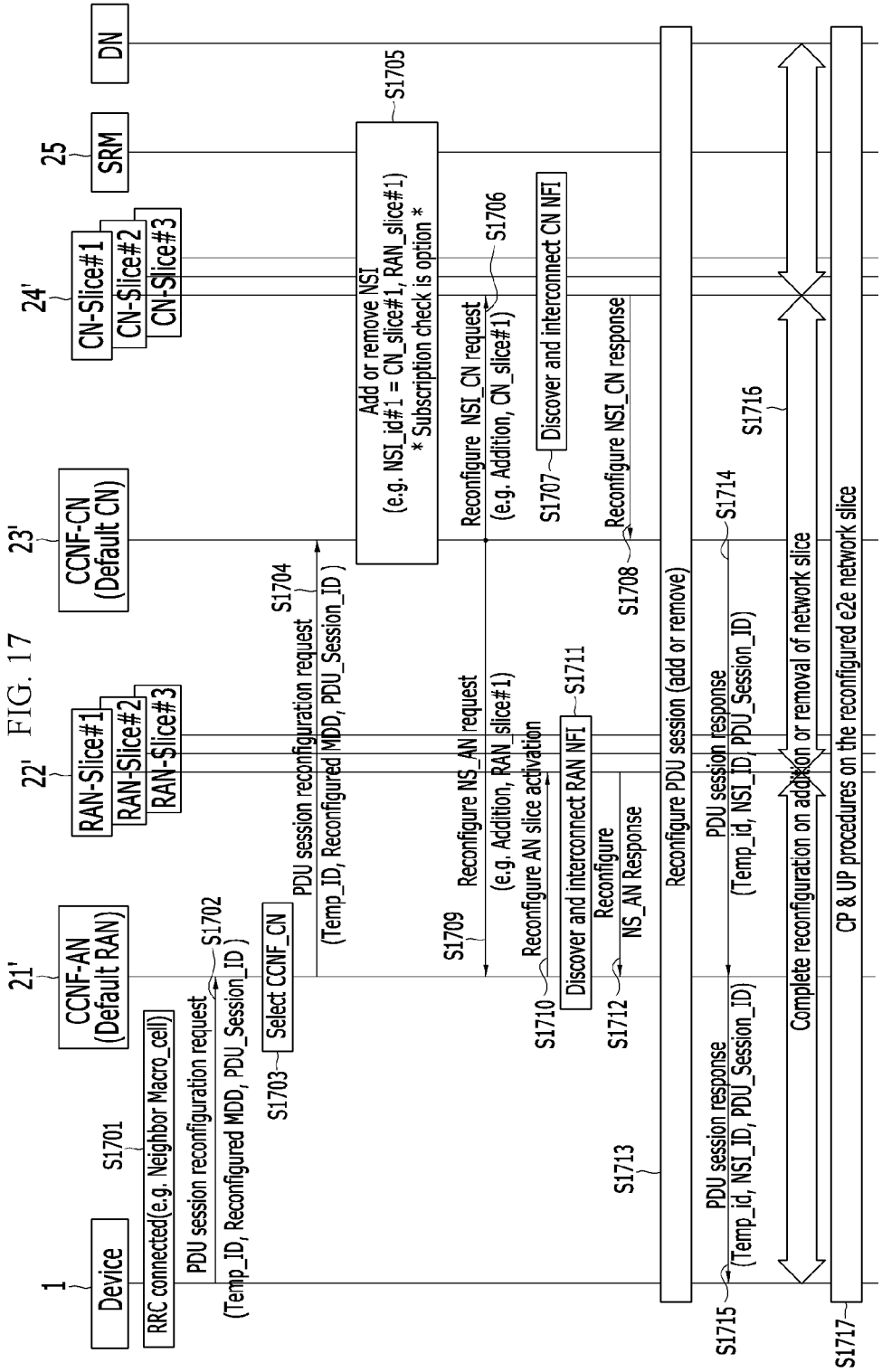
FIG. 17 shows a flowchart of a process for adding a network slice or dropping the same according to an exemplary embodiment of the present invention.

FIG. 17 shows a flowchart of a process for adding a network slice or dropping the same according to an exemplary embodiment of the present invention.

As shown in FIG. 17, when the device 1 changes the provided service while radio-accessing the CCNF-AN 21' (S1701), it transmits a PDU session reconfiguration request including information on the changed service type to the CCNF-AN 21' (S1702). The PDU session reconfiguration request includes a Temp_id, a reconfiguration MDD (Reconfigured MDD), and a PDU_Session_ID, and the reconfiguration MDD may include information on the slice-type to be added or dropped, that is, the service type.

The CCNF-AN 21' selects the core network (CCNF-CN) 23' (S1703), and transmits the PDU session reconfiguration request to the selected CCNF-CN 23' (S1704). The CCNF-CN 23' adds a new network slice or drops the existing network slice based on the transmitted information. In detail, when a new service type is requested, it is determined to add a RAN slice (e.g., RAN_Slice#1) and a CN slice (e.g., CN Slice#1) corresponding to the new service type (e.g., NSI_id#1=RAN_Slice#1, CN Slice#1) (S1705). In this case, it may be determined to add the network slice by additionally considering the subscriber profile such as the subscriber registration and authentication information provided by the SRM 31. In another way, when it is requested to release the existing network slice, it is determined to drop the corresponding network slice.

The CCNF-CN 23' transmits a reconfiguration CN slice request (Reconfigure NSI_CN request) to the CN slice (e.g., CN Slice#1 or CN NSI#1) 24' determined to be added (S1706), and the CN slice (e.g., CN Slice#1) discovers the corresponding CN NFI and interconnects the same (S1707). This corresponds to the configuring of the resource and the network function to the CN slice. The CCNF-CN 23' may request the CN slice (e.g., CN Slice#2 or CN NSI#2) that is determined to be dropped to release the function/resource, thereby releasing the function element and the resource element used in the device and the corresponding CN slice.

The CN slice transmits a response (Reconfigure NSI_CN response) to the reconfiguration CN slice request to the CCNF-CN 23' (S1708).

Further, the CCNF-CN 23' transmits a reconfiguration RAN slice request (Reconfigure NSI_AN request) on the RAN slice (e.g., RAN Slice#1 or AN NSI#1) determined to be added to the CCNF-AN 21' (S1709), and the CCNF-AN 21' instructs the reconfiguration RAN slice activation (Reconfigure AN slice activation) to the RAN slice (e.g., RAN Slice#1, 22') determined to be added (S1710). Therefore, the RAN slice (e.g., RAN Slice#1) discovers the corresponding RAN NFI and interconnects them (S1711). This corresponds to the configuring of the corresponding resource and the network function to the RAN slice. The CCNF-AN 21' may request to release the function/resource from the RAN slice (e.g., RAN Slice#2 or RAN NSI#2) determined to be dropped, thereby releasing the function element and the resource element used in the device and the corresponding RAN slice. The RAN slice (e.g., RAN Slice#1) transmits a response (Reconfigure AN slice activation response) to the instruction of the reconfiguration RAN slice activation to the CCNF-AN 21' (S1712). Therefore, reconfiguration (adding or dropping) of a PDU session to/from the newly added network slice is finished (S1713).

The CCNF-CN 23' transmits a response (PUD session response) to the PDU session request by the device to the device 1 through the CCNF-AN 21' (S1714 and S1715). The PDU session request response (PUD session response) may include a Temp_id, an NSI_ID, and a PDU_Session_ID.

Through the procedure, the added network slice-connection may be completed, the random network slice may be dropped (S1716), and the CP and UP process through the reconfigured E2E network slice is performed (S1717).

As described above, according to an exemplary embodiment of the present invention, the optimized network slice configuration fitting the characteristics of various user cases may be formed based on the network slice structure. Hence, the subscriber is provided with the optimized communication environment so it is easy to substantially improve the experienced quality of communication. In addition, the service provider may provide convenience of service acceptance, reduction of costs, and differentiated network infrastructures.

Figure 18:
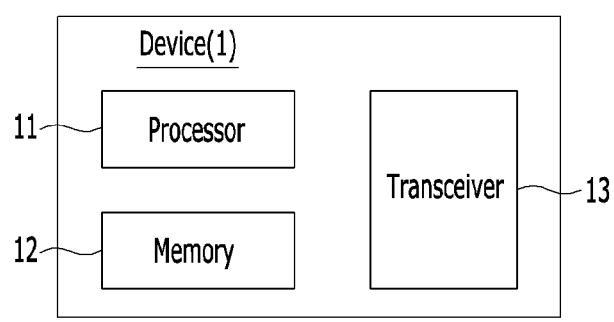
FIG. 18 shows a configuration diagram of a device according to an exemplary embodiment of the present invention.

FIG. 18 shows a configuration diagram of a device according to an exemplary embodiment of the present invention.

As shown in FIG. 18, the device 1 includes a processor 11, a memory 12, and a transceiver 13. The processor 11 may be configured to realize the methods that are described with reference to FIG. 1 to FIG. 17.

The memory 12 is connected to the processor 11 and stores various kinds of information relating to an operation of the processor 11. The memory 12 may store instructions to be performed by the processor 11 or may receive instructions from a storage device (not shown) and may temporarily store the same. The processor 11 may perform the instructions stored or received in the memory 12. The processor 11 may be connected to the memory 12 through a bus (not shown), and an input/output interface (not shown) may be connected to the bus.

Figure 19:
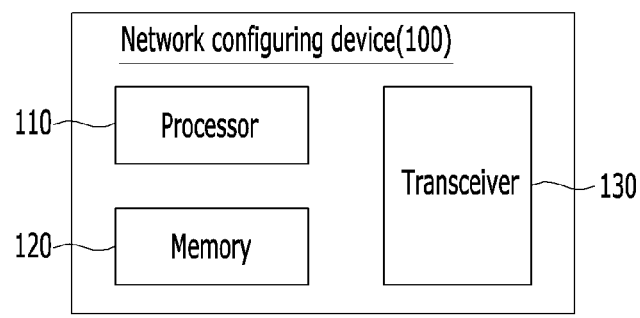
FIG. 19 shows a configuration diagram of a network configuring device according to an exemplary embodiment of the present invention.

FIG. 19 shows a configuration diagram of a network configuring device according to an exemplary embodiment of the present invention.

As shown in FIG. 19, the network configuring device 100 includes a processor 110, a memory 120, and a transceiver 130.

The processor 110 may be configured to realize the methods that are described with reference to FIG. 1 to FIG. 17.

The memory 120 is connected to the processor 110 and stores various kinds of information relating to an operation of the processor 110. The memory 120 may store instructions to be performed by the processor 110 or may receive instructions from a storage device (not shown) and may temporarily store the same. The memory 120 may include an NS-DB.

The processor 110 may perform the instructions stored or received in the memory 120. The processor 110 may be connected to the memory 120 through a bus (not shown), and an input/output interface (not shown) may be connected to the bus.

The network configuring device 100 may allow the network manager, the access network, or the core network to select a network slice and configure it.

According to an exemplary embodiment of the present invention, the optimized network slice may be determined according to various service requirements based on the network slice structure using the virtualization concept of the network resource in the mobile communication system, and optimized configuration information on the resource and the function of the determined network slice may be flexibly formed. Therefore, the subscriber may receive the optimized communication environment so it is easy to substantially improve the experienced communication quality. Further, the service provider may provide convenience of service acceptance, reduction of costs, and different network infrastructures.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication network system comprising:
   a common control access network to which network slicing according to a service type is not applied;
   at least one access network slice added according to a service type requested by a device;
   a common control core network; and
   at least one core network slice added according to a service type requested by the device,
   wherein the access network slice and the core network slice are determined by the service type requested by the device, and
   a number of the access network slices and a number of the core network slices determined according to the service type requested by the device correspond to each other.

2. The communication network system of claim 1, wherein
   when the device requests a first service and a second service,
   a first access network slice caused by a type of the first service and a second access network slice caused by a type of the second service are configured.

3. The communication network system of claim 2, wherein
   when the device requests a first service and a second service,
   a first core network slice caused by a type of the first service and a second core network slice caused by a type of the second service are configured.

4. The communication network system of claim 3, wherein
   one of the common control access network and the common control core network determines an access network slice and a core network slice corresponding to a service type requested by the device from among a plurality of access network slices and a plurality of core network slices.

5. The communication network system of claim 4, wherein
   one of the common control access network and the common control core network drops one of the plurality of access network slices or drops one of the plurality of core network slices.

6. The communication network system of claim 1, wherein
   the common control access network is an initial access network accessed as a default when a new connection is attempted according to a new call or a common control slice having a function performed in common from among access network slices.

7. The communication network system of claim 6, wherein
the common control access network performs a common control function including authentication and mobility control, and provides a service not supported by the access network slice.

8. The communication network system of claim 6, wherein
the common control core network is an initial core network accessed as a default when a new connection is attempted according to a new call, or a common control slice having a function performed in common by core network slices.

9. The communication network system of claim 1, wherein
one of the common control access network and the common control core network adds a new access network slice and a new core network slice corresponding to the service type requested by the device.

10. A method for configuring a network in a communication network system, comprising:
allowing a network configuring device that is one of a common control access network to which network slicing according to a service type is not applied and a common control core network of the communication network system to determine a network slice corresponding to a service type requested by a device; and
allowing the network configuring device to instruct the determined network slice to configure a resource and a function corresponding to the service type,
wherein the network slice includes an access network slice corresponding to the service type, and further includes a core network slice according to the service type,
the access network slice and the core network slice are configured for respective service types, and
a number of the access network slices and a number of the core network slices included in the network slice determined according to the service type requested by the device correspond to each other.

11. The method of claim 10, further comprising:
allowing the network configuring device to determine to add a new network slice corresponding to a new service type requested by a device; and
allowing the network configuring device to instruct the network slice determined to be added to configure a function corresponding to the service type.

12. The method of claim 11, wherein
the instructing to configure a function corresponding to the service type further includes:
allowing the network slice determined to be added to receive an activation request from the network configuring device;
allowing the network slice determined to be added to discover a corresponding network function and interconnect the discovered network function; and
after the network slice determined to be added performs the process, transmitting a response to the activation request to the network configuring device.

13. The method of claim 11, further comprising
allowing the network configuring device to determine to drop the network slice corresponding to the existing service type when the service type requested by the device is changed; and
allowing the network configuring device to instruct the network slice determined to be dropped to release the corresponding resource and the function.

14. The method of claim 10, wherein
the determining of a network slice includes
determining the network slice by additionally considering a subscriber profile including subscriber registration and authentication information.

15. The method of claim 10, wherein
the network configuring device corresponds to an initial network accessed as a default when a new connection is attempted according to a new call, or a common control slice having a function performed in common from among network slices.

16. A method for configuring a network in a communication network system, comprising:
allowing a network manager for controlling an access network and a core network to receive a service requirement including a service type of a device;
allowing the network manager to determine a network slice satisfying the service requirement;
allowing the network manager to form network configuration information on a resource and a function of the determined network slice; and
allowing the network manager to transmit the network configuration information to the determined network slice so that the determined network slice may configure the resource and the function,
wherein the network slice includes an access network slice corresponding to the service type and further includes a core network slice according to the service type, and
a number of the access network slices and a number of the core network slices determined according to the service type requested by the device correspond to each other.

17. The method of claim 16, wherein
the determining of a network slice includes binding an access network slice corresponding to the service type and the core network slice to configure a network slice, and
the configuring of a network slice includes at least one of:
changing the configuration of the access network slice, and maintaining the configuration of the core network slice;
maintaining the configuration of the access network slice, and changing the configuration of the core network slice; and
changing the configuration of the access network slice and the configuration of the core network slice.

18. A method for configuring a network in a communication network system, comprising:
receiving, by a common control core network, a network selection request message including a service type requested by a device from a common control access network;
determining, by the common control core network, at least one access network slice and at least one core network slice corresponding to the service type to form a dedicated network slice instance;
comparing, by the common control core network, the dedicated network slice instance with a default network that is selected at an initial call setting;
using, by the common control core network, the default network without changing the default network when configuration information of a resource and a function of the default network corresponds to a resource and a function of the dedicated network slice instance; and
using, by the common control core network, the dedicated network slice instance to access the determined at least one access network slice and at least one core network slice when configuration information of the resource and the function of the default network do not correspond to the resource and the function of the dedicated network slice instance, wherein network slicing according to a service type is not applied to the common control core network and the common control access network.

19. The method of claim 18, further comprising:

before the receiving of the network selection request message, selecting, by the device, a common control access network as a default when information needed to select an access network slice is not provided at the initial call setting;

transmitting, by the device, a service requesting message including the service type to the common control access network;

selecting, by the common control access network slice, the common control core network as a default when information needed to select a core network slice is not provided; and transmitting, by the common control access network slice, the network selection request message to the common control core network, wherein the default network includes the common control access network and the common control core network.

20. The method of claim 18, further comprising:

instructing, by the common control core network, the determined at least one core network slice to configure a resource and a function corresponding to the service type;

instructing, by the common control core network, the common control access network to select the determined at least one access network slice so that the common control access network instructs the determined at least one access network slice to configure a resource and a function corresponding to the service type; and notifying, by the common control core network, the device that configuration of the resources and functions is complete, wherein the deceive stores information on the configuration of the resources and functions so that the determined at least one core network slice and the determined at least one access network slice enter a communication allowable state corresponding to the service type.

\* \* \* \* \*